US011520175B2

(12) United States Patent
Lebby et al.

(10) Patent No.: US 11,520,175 B2
(45) Date of Patent: Dec. 6, 2022

(54) ACTIVE REGION-LESS MODULATOR AND METHOD

(71) Applicant: Lightwave Logic Inc., Englewood, CO (US)

(72) Inventors: Michael Lebby, San Francisco, CA (US); Zhiming Liu, Englewood, CO (US)

(73) Assignee: Lightwave Logic Inc., Englewood, CO (US)

( * ) Notice: Subject to any disclaimer, the term of this patent is extended or adjusted under 35 U.S.C. 154(b) by 159 days.

(21) Appl. No.: 16/867,262

(22) Filed: May 5, 2020

(65) Prior Publication Data

US 2021/0141251 A1 May 13, 2021

Related U.S. Application Data

(63) Continuation-in-part of application No. 16/680,900, filed on Nov. 12, 2019.

(51) Int. Cl.
*G02F 1/065* (2006.01)
*G02F 1/225* (2006.01)
*G02F 1/21* (2006.01)

(52) U.S. Cl.
CPC .............. *G02F 1/065* (2013.01); *G02F 1/225* (2013.01); *G02F 1/212* (2021.01); *G02F 2202/09* (2013.01); *G02F 2202/38* (2013.01)

(58) Field of Classification Search
CPC ............................ G02F 1/0553; G02F 2202/38
See application file for complete search history.

(56) References Cited

U.S. PATENT DOCUMENTS

| 7,693,355 | B2* | 4/2010 | Peyghambarian | ...... G02F 1/065 |
| | | | | 385/129 |
| 7,912,327 | B2* | 3/2011 | DeRose | .................. G02F 1/065 |
| | | | | 385/129 |
| 9,772,447 | B2* | 9/2017 | Keyvaninia | ........... H01S 5/0215 |
| 10,921,682 | B1* | 2/2021 | Wang | .................. G02B 6/1345 |
| 11,042,051 | B2* | 6/2021 | Lebby | ..................... G02F 1/225 |
| 2021/0141251 | A1* | 5/2021 | Lebby | ..................... G02F 1/065 |

* cited by examiner

*Primary Examiner* — Rhonda S Peace
(74) *Attorney, Agent, or Firm* — Parsons & Goltry; Robert Parsons; Michael Goltry

(57) ABSTRACT

A polymer modulator including a waveguide core defined over an insulating layer and having a first passive region including a light input, a second passive region including a light output, and an active region optically coupling the passive regions into a continuous waveguide core between the input and output. The waveguide core in the first and second passive regions including one of sol-gel and $SiO_2$ surrounded by cladding including one of sol-gel and $SiO_2$. The cladding in the passive regions having a first refractive index, the waveguide core in both regions having a second refractive index at least 0.01 higher than the first refractive index. The waveguide core in the active region including sol-gel, a cladding layer of sol-gel positioned between the insulating layer and the waveguide core, the refractive index of the waveguide core is at least 0.01 higher than the refractive index of the cladding layer.

12 Claims, 52 Drawing Sheets

CROSS-SECTION OF THE ACTIVE REGION-LESS MODULATOR L AND LL
BOTH 1-DIMENSIONAL AND 2-DIMENSIONAL POINTED ENDS TO THE ACTIVE REGION

TYPICAL STRUCTURE OF A MODULATOR SHOWING THE ACTIVE REGION CORE GOING DIRECTLY TO THE EDGE OF THE CHIP

SHOWING TYPICAL CROSS SECTION

PASSIVE CORE REGION-REACHING THE EDGES OF THE MODULATOR CHIP

CROSSSECTION OF THE ACTIVE REGION-LESS MODULATOR CC

ACTIVE REGION ENDS CAN BE SHAPED, AND THE LENGTH CAN BE VARIED.

ACTIVE REGION ENDS CAN BE SHAPED, AND THE LENGTH CAN BE VARIED.

SHOWING CROSS SECTION CC THROUGH THE ACTIVE REGION ON ONE OF THE ARMS OF THE MACH ZEHNDER MODULATOR

SHOWING CROSS SECTION CC THROUGH THE ACTIVE REGION ON ONE OF THE ARMS OF THE MACH ZEHNDER MODULATOR

SHOWING CROSS SECTION CC THROUGH THE ACTIVE REGION ON ONE OF THE ARMS OF THE MACH ZEHNDER MODULATOR

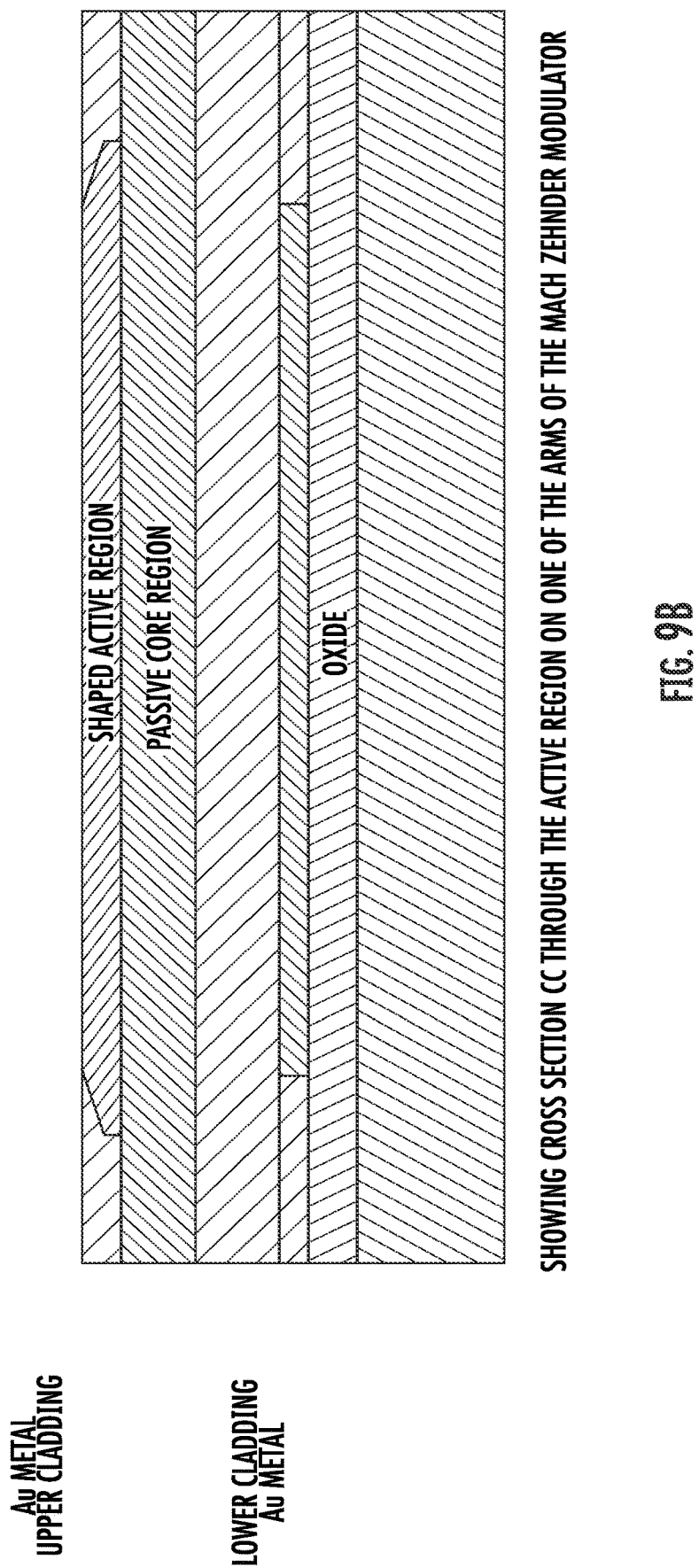

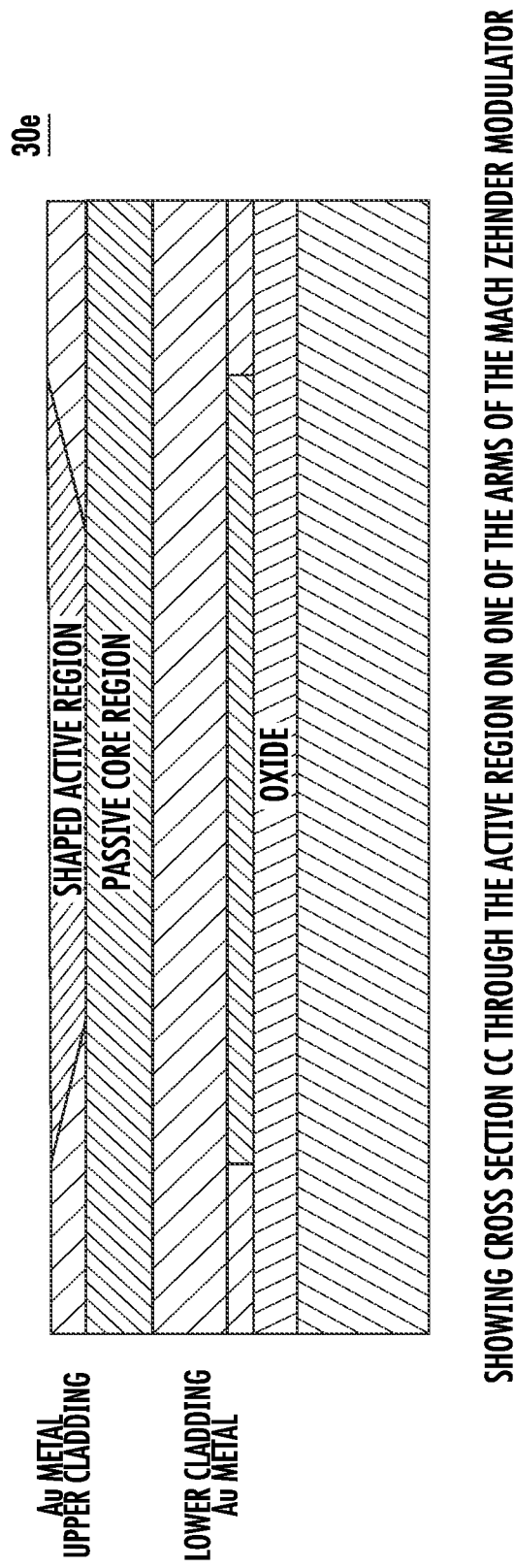
FIG. 11A SHOWING CROSS SECTION CC THROUGH THE ACTIVE REGION ON ONE OF THE ARMS OF THE MACH ZEHNDER MODULATOR

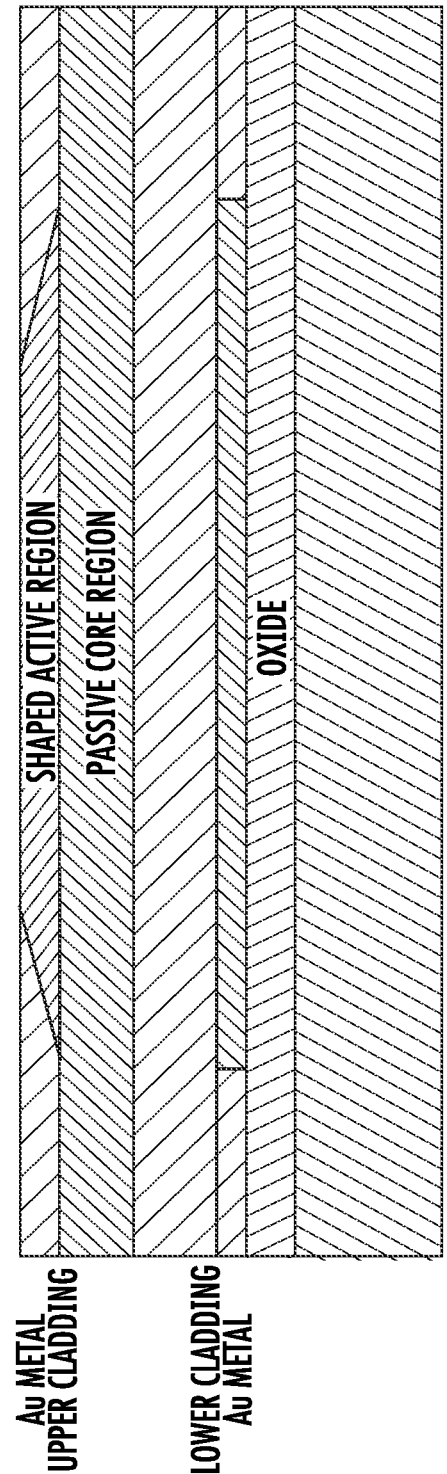

THE ACTIVE REGION (SHAPED) IS POSITIONED ON TOP OF THE PASSIVE CORE REGION. LIGHT IS COUPLED INTO AND UP INTO THE ACTIVE REGION THROUGH EVANESCENT OPTICAL COUPLING. THE METALLIC ELECTRODES ARE BOTH ABOVE AND BELOW THE CLADDING REGIONS.

SHOWING CROSS SECTION CC THROUGH THE ACTIVE REGION ON ONE OF THE ARMS OF THE MACH ZEHNDER MODULATOR

SHOWING CROSS SECTION CC THROUGH THE ACTIVE REGION ON ONE OF THE ARMS OF THE MACH ZEHNDER MODULATOR

CROSS-SECTION OF THE ACTIVE REGION-LESS MODULATOR XX

SHOWING CROSS SECTION CC THROUGH THE ACTIVE REGION ON ONE OF THE ARMS OF THE MACH ZEHNDER MODULATOR

CROSS-SECTION OF THE ACTIVE REGION-LESS MODULATOR YY

SHOWING CROSS SECTION YY THROUGH THE ACTIVE REGION ON ONE OF THE ARMS OF THE MACH ZEHNDER MODULATOR SHOWING THAT IT CO-PLANAR WITH THE PASSIVE REGION ON 2 SIDES.

CROSS-SECTION OF THE ACTIVE REGION-LESS MODULATOR YY
THE KEY IS THE TAPERED CO-PLANAR DESIGN

SHOWING CROSS SECTION YY THROUGH THE ACTIVE REGION ON ONE OF THE ARMS OF THE MACH ZEHNDER MODULATOR SHOWING THAT IT SURROUNDS THE PASSIVE REGION ON 2 SIDES.

CROSS-SECTION OF THE ACTIVE REGION-LESS MODULATOR KK

SHOWING CROSS SECTION YY THROUGH THE ACTIVE REGION ON ONE OF THE ARMS OF THE MACH ZEHNDER MODULATOR SHOWING THAT IT SURROUNDS THE PASSIVE REGION ON ALL 4 SIDES.

CROSS-SECTION OF THE ACTIVE REGION-LESS MODULATOR L AND LL
BOTH 1-DIMENSIONAL AND 2-DIMENSIONAL POINTED ENDS TO THE ACTIVE REGION

SHOWING CROSS SECTION LL THROUGH THE ACTIVE REGION ON ONE OF THE ARMS OF THE MACH ZEHNDER MODULATOR

FIG. 24 SHOWING CROSS SECTION LL THROUGH THE ACTIVE REGION ON ONE OF THE ARMS OF THE MACH ZEHNDER MODULATOR

CROSS-SECTION OF THE ACTIVE REGION-LESS MODULATOR MM
BOTH 1-DIMENSIONAL AND 2-DIMENSIONAL POINTED ENDS TO THE ACTIVE REGION

SHOWING CROSS SECTION YY THROUGH THE ACTIVE REGION ON ONE OF THE ARMS OF THE MACH ZEHNDER MODULATOR SHOWING THAT IT SURROUNDS THE PASSIVE REGION ON ALL 4 SIDES.

CROSS-SECTION OF THE ACTIVE REGION-LESS MODULATOR ZZ
BOTH 1-DIMENSIONAL AND 2-DIMENSIONAL POINTED ENDS TO THE ACTIVE REGION

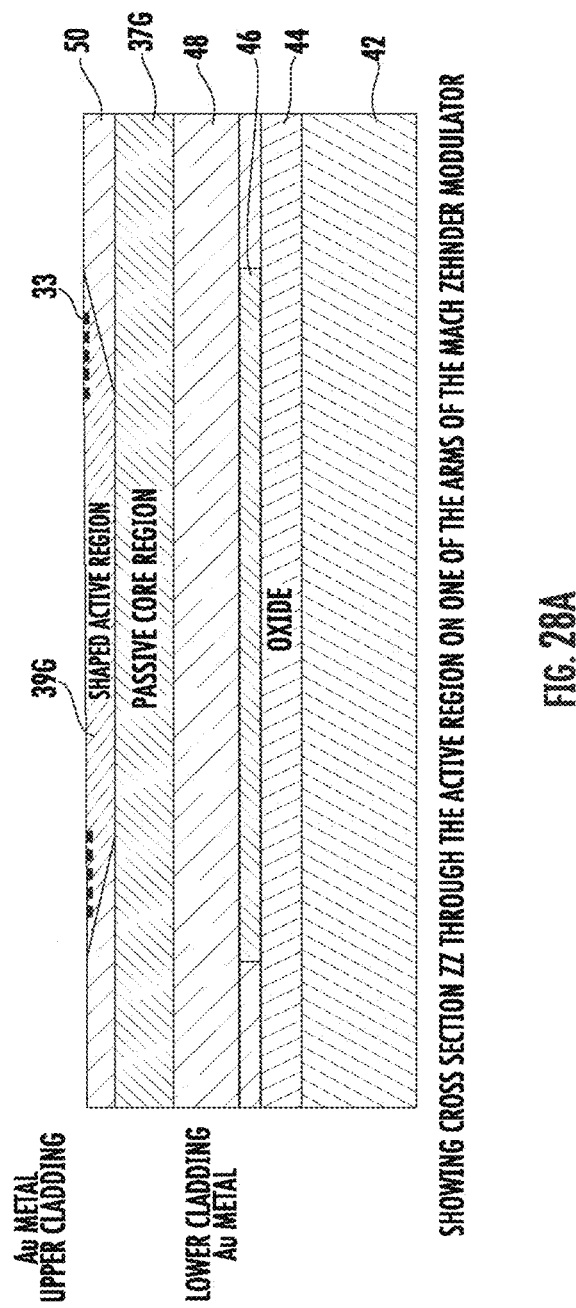
FIG. 28A SHOWING CROSS SECTION ZZ THROUGH THE ACTIVE REGION ON ONE OF THE ARMS OF THE MACH ZEHNDER MODULATOR SHOWING CROSS SECTION ZZ THROUGH THE ACTIVE REGION ON ONE OF THE ARMS OF THE MACH ZEHNDER MODULATOR

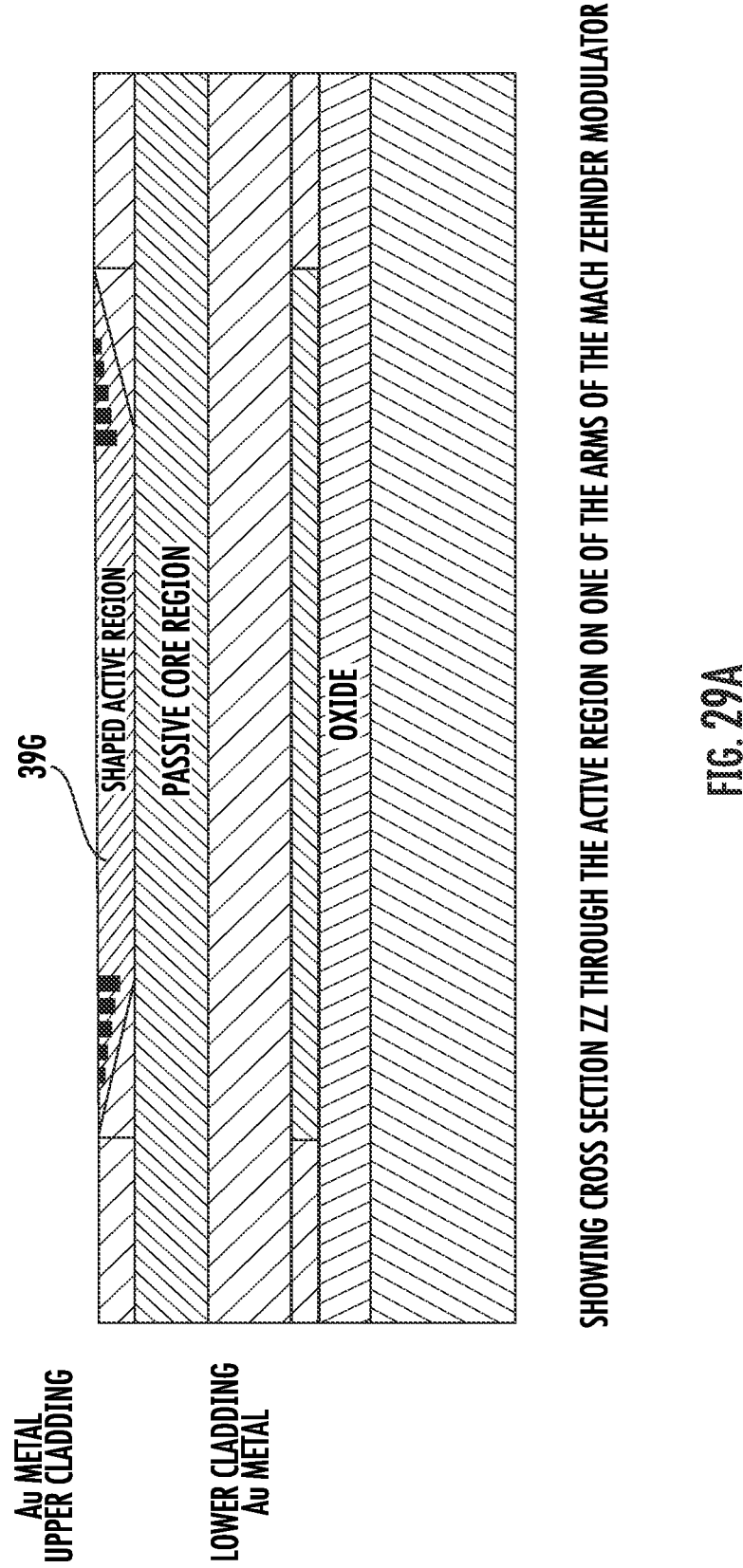
FIG. 29A — SHOWING CROSS SECTION ZZ THROUGH THE ACTIVE REGION ON ONE OF THE ARMS OF THE MACH ZEHNDER MODULATOR

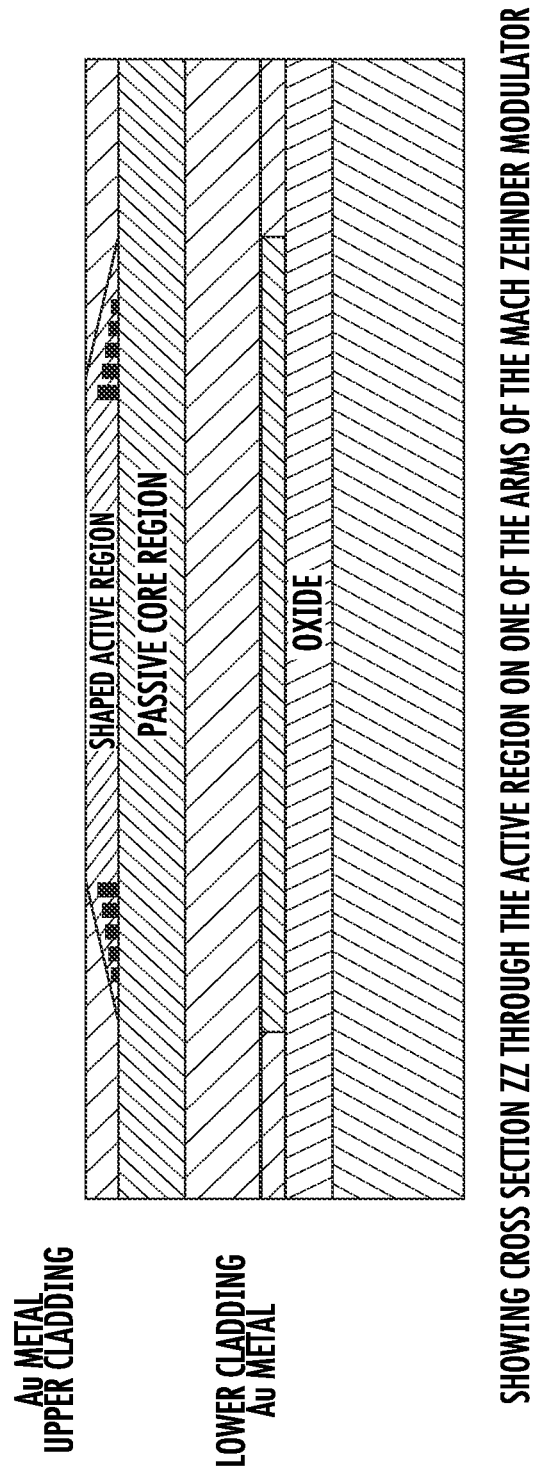
FIG. 29B SHOWING CROSS SECTION ZZ THROUGH THE ACTIVE REGION ON ONE OF THE ARMS OF THE MACH ZEHNDER MODULATOR

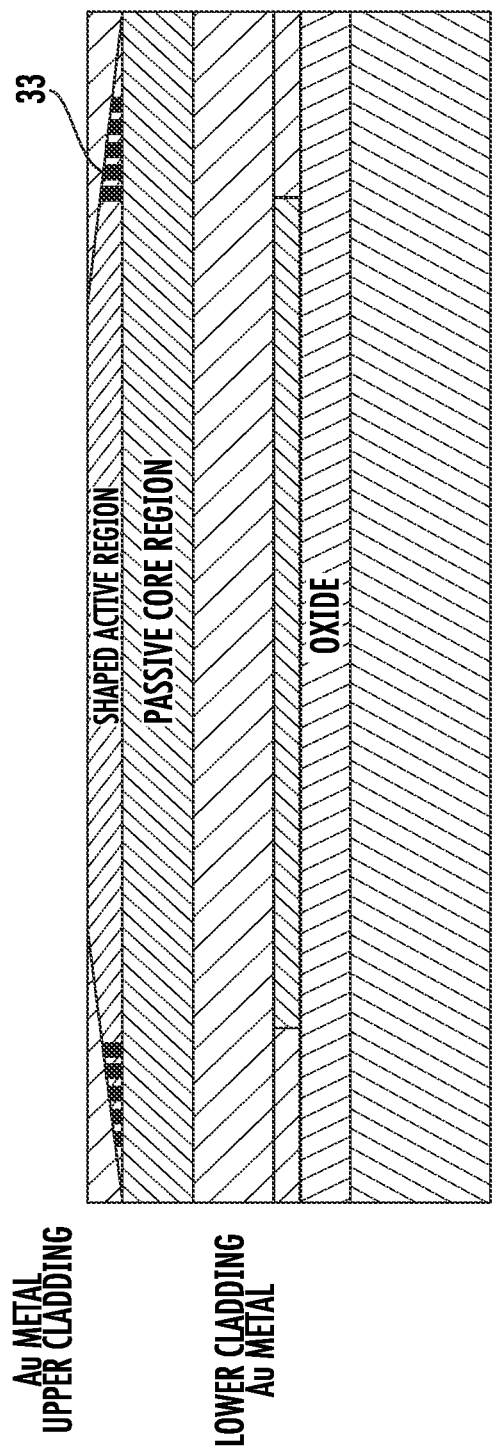
FIG. 29C SHOWING CROSS SECTION ZZ THROUGH THE ACTIVE REGION ON ONE OF THE ARMS OF THE MACH ZEHNDER MODULATOR

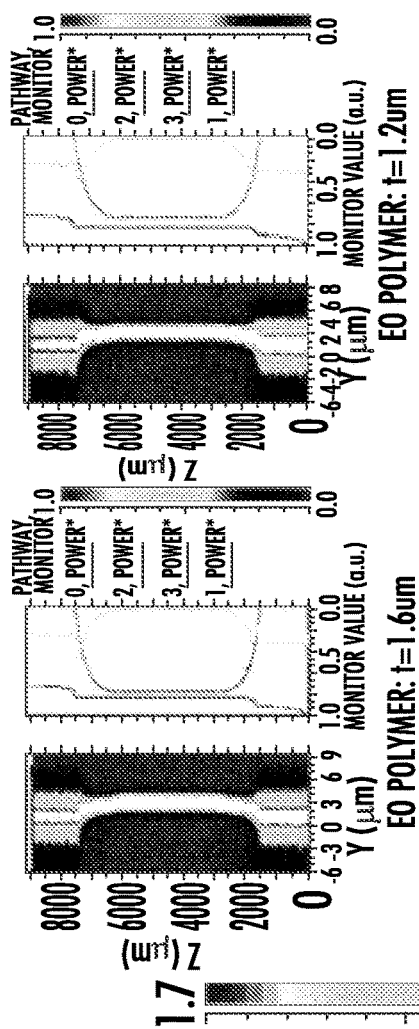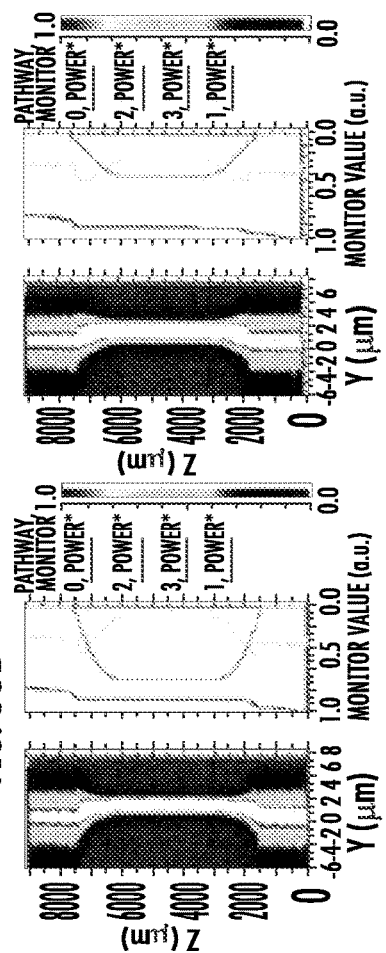
FIG. 33C
FIG. 33E
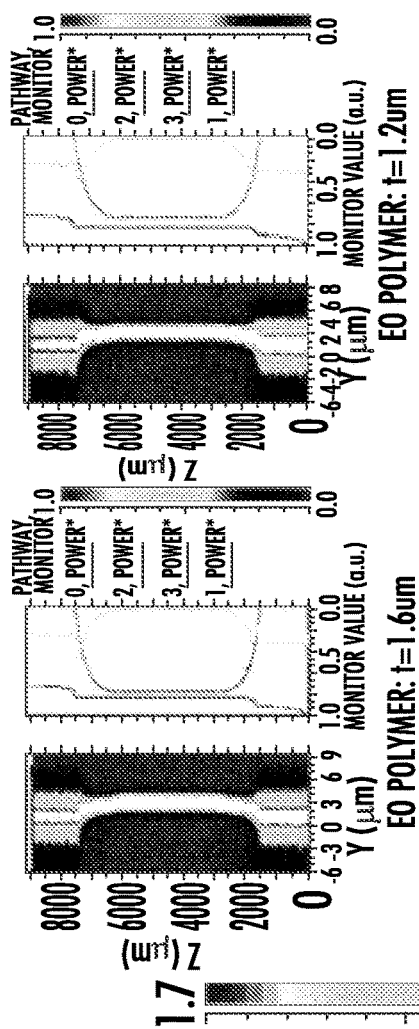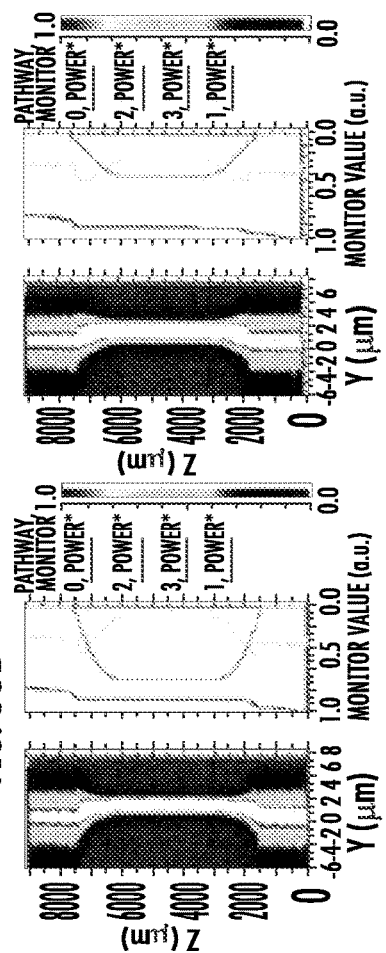
FIG. 33B
FIG. 33D
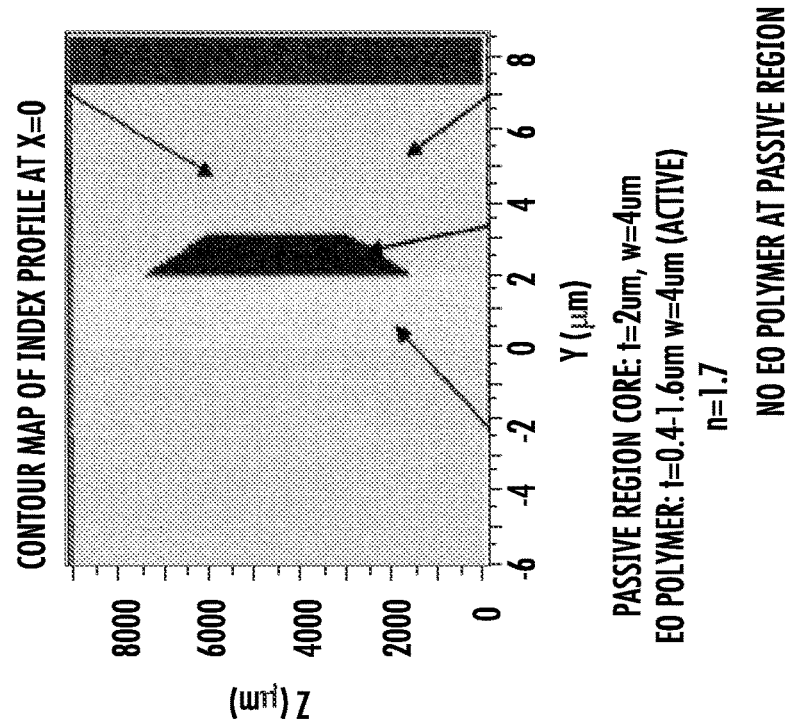
FIG. 33A

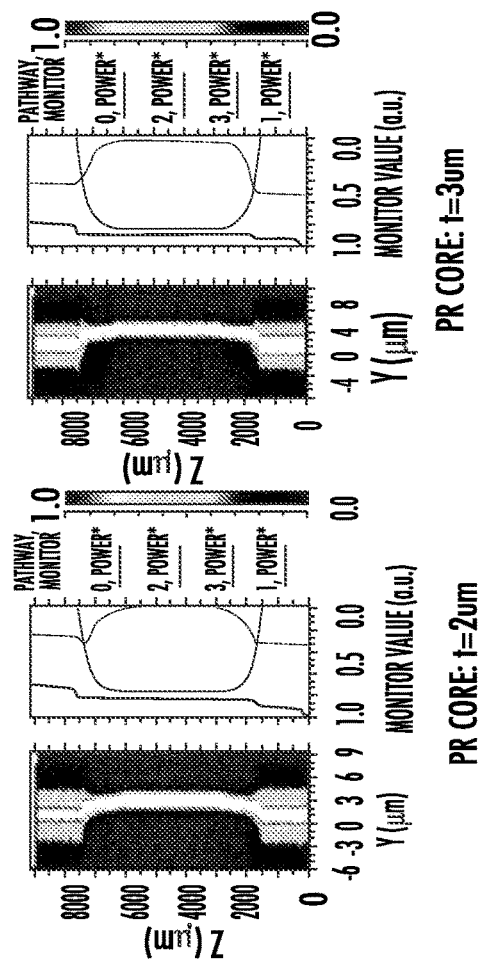
FIG. 34B
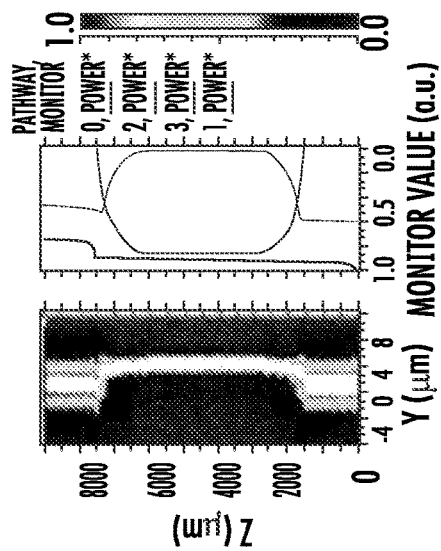
FIG. 34C
FIG. 34D
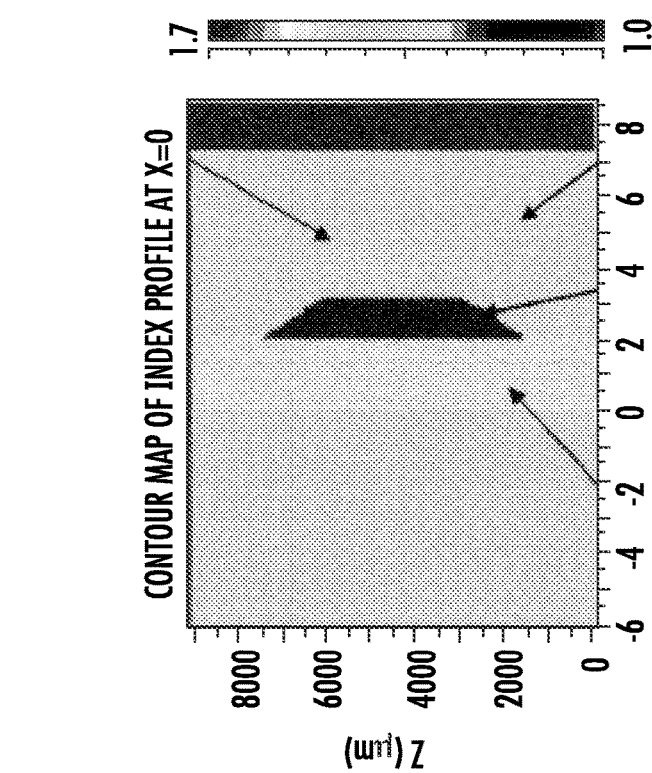
FIG. 34A

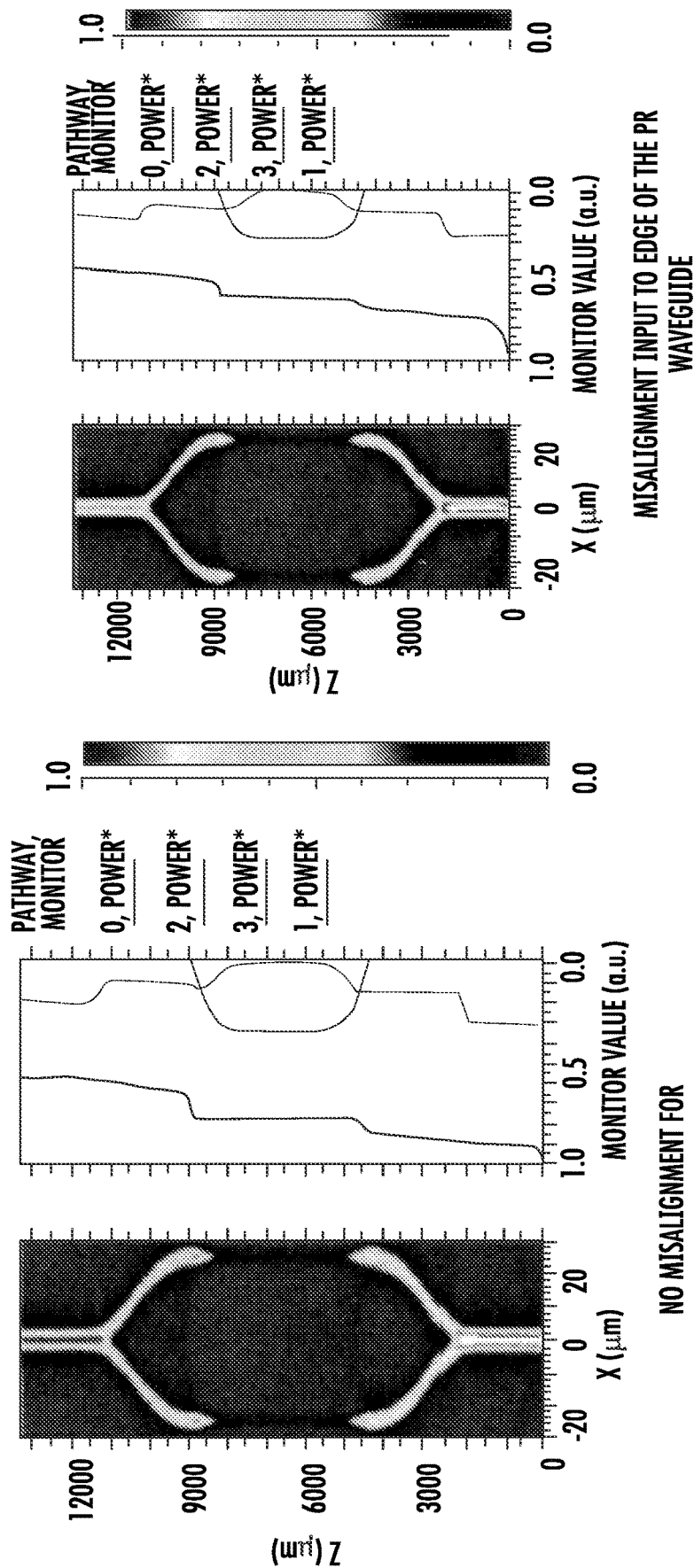

SPIN COATING SG BOTTOM CLAD

SPIN COATING SG CORE AND WG PATTERNING

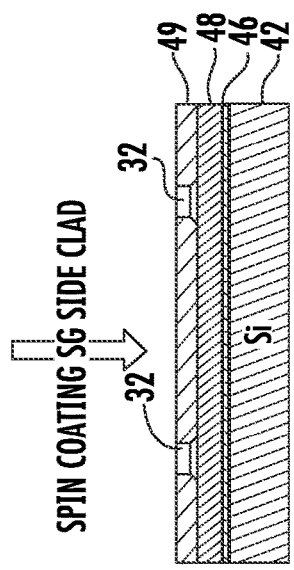
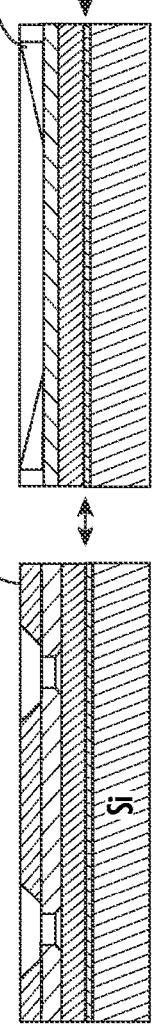
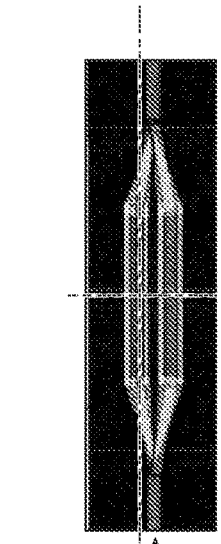
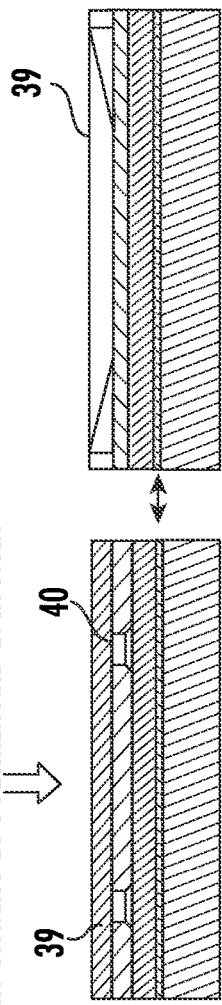
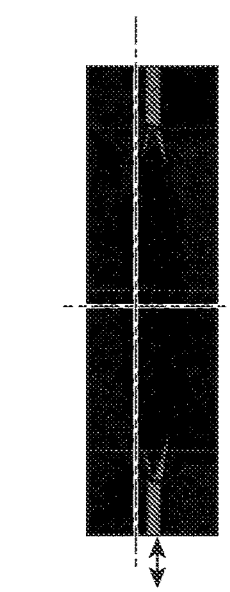
FIG. 39 SPIN COATING SG SIDE CLAD
FIG. 40A SPIN COATING SG CLAD AND TAPERED TRENCH PATTERNING
FIG. 40B
FIG. 40C
FIG. 41A SPIN COATING EO POLYMER AND ETCH BACK
FIG. 41B
FIG. 41C

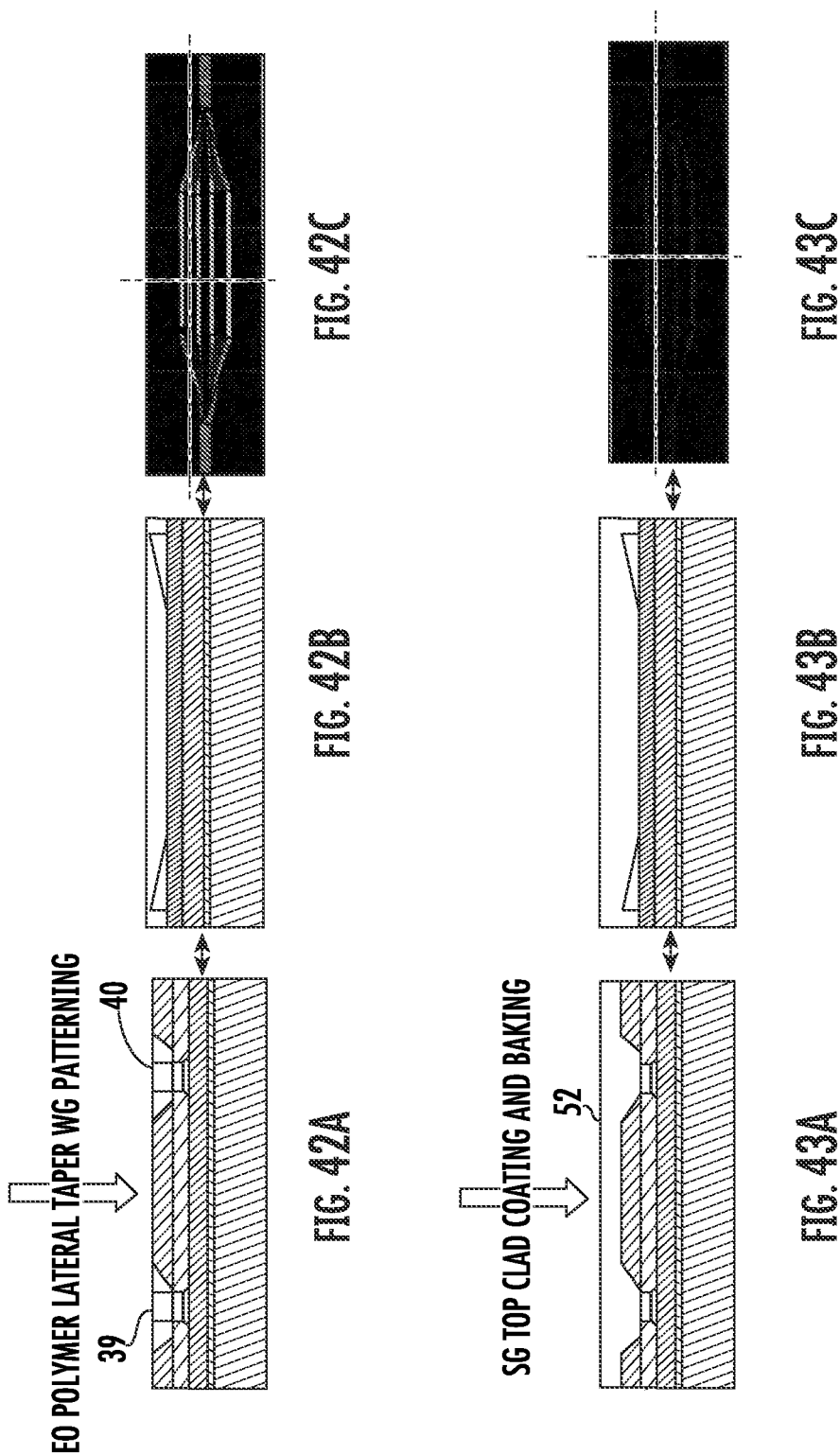

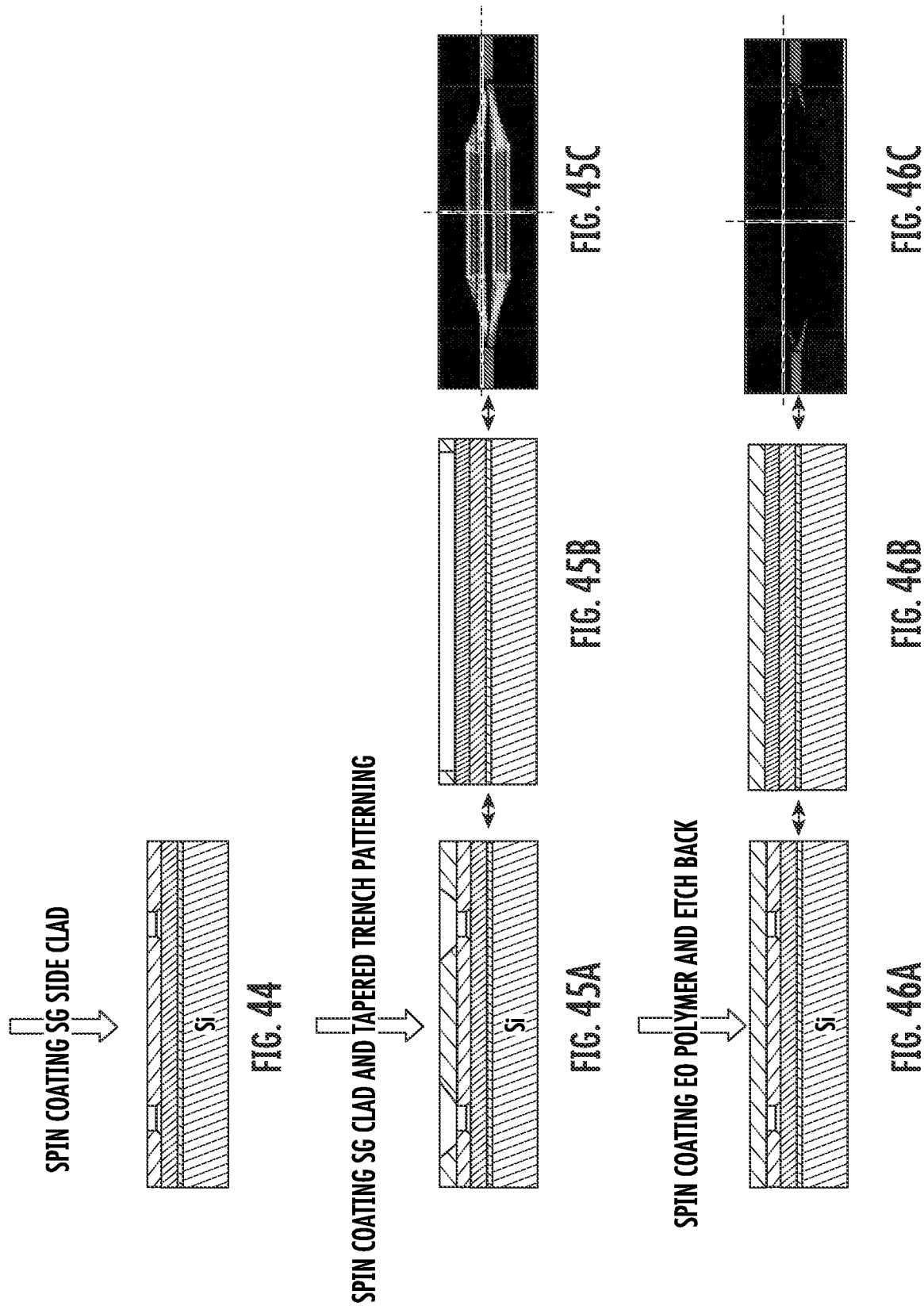

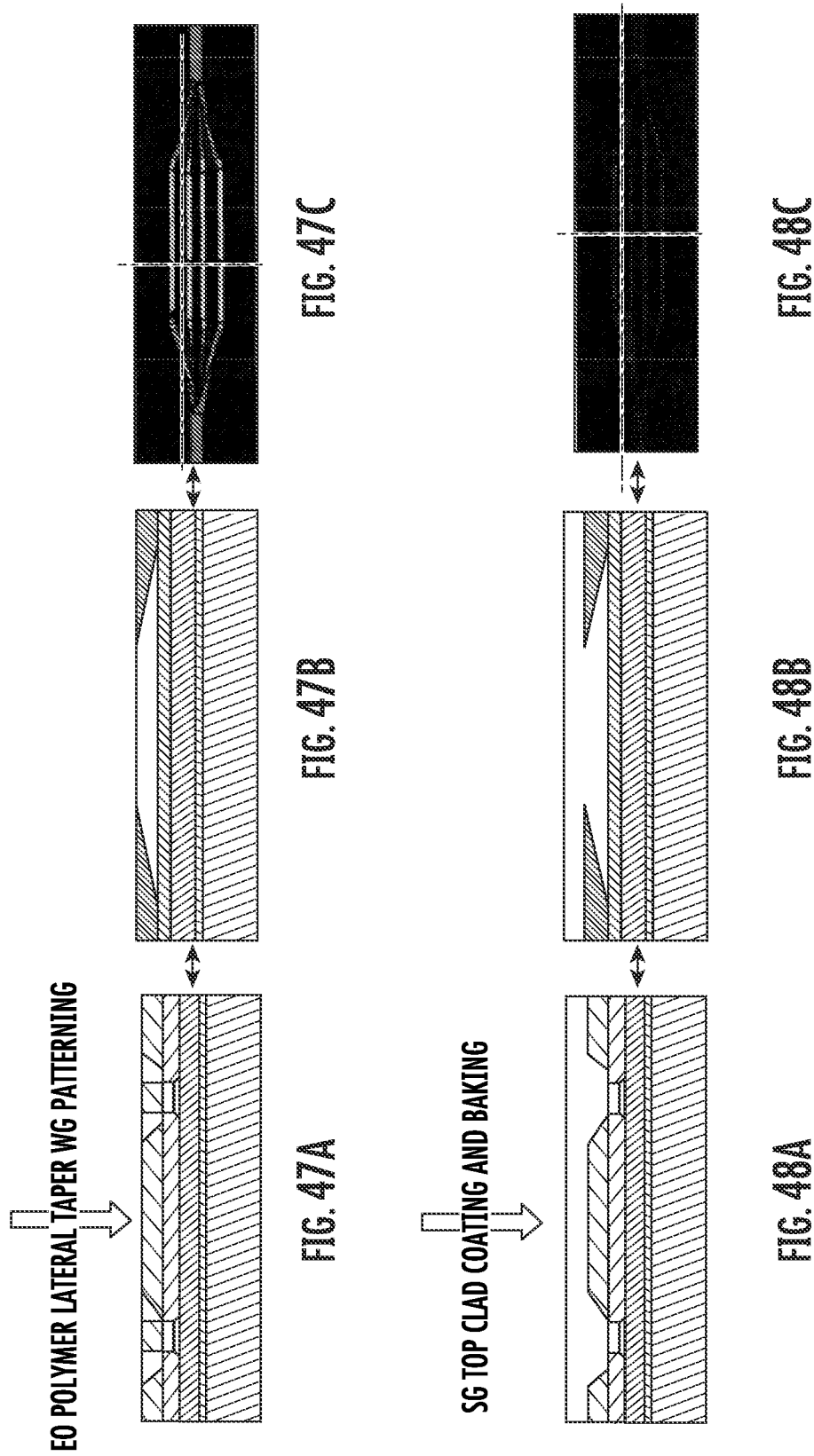

ACTIVE REGION-LESS MODULATOR AND METHOD

CROSS-REFERENCE TO RELATED APPLICATION

This application is a Continuation-in-Part of U.S. patent application Ser. No. 16/680,900, filed 12 Nov. 2019, and claims the benefit thereof.

FIELD OF THE INVENTION

This invention relates to polymer modulators and more specifically to modulators with electro optic cores that do not reach the edges of the chip they are included within.

BACKGROUND OF THE INVENTION

A polymer ridge waveguide is typically made of a lower cladding layer, an active region and an upper cladding layer. A modulator formed from this prior art waveguide has additional top and bottom electrodes for input of the modulating electrical signals. An active region layer is a host guest system made of a host polymer and a guest chromophore, or multiple guest chromophores, or monolith (or 100%) of a chromophore, or polymers with chromophores in their main chains or side chains. In prior art modulators the active region transverses the complete modulator structure so that light being modulated enters directly into and exits directly out of the active region layer.

Because the prior art active region layer is limited in thickness and size, direct input and output coupling to optical fibers and free space light can be inefficient and require tight tolerances that increase cost and reduce efficiency.

It would be highly advantageous, therefore, to remedy the foregoing and other deficiencies inherent in the prior art.

Accordingly, it is an object of the present invention to provide a new and improved active region-less polymer modulator with more efficient optical coupling between the modulator chip and the outside world.

It is another object of the present invention to provide a new and improved active region-less polymer modulator with higher reliability, since the active material is never exposed to the outside world-atmosphere.

It is another object of the present invention to provide a new and improved active region-less polymer modulator with higher reliability, since the active material is not subject to optical reflections, rough surfaces, and other effects that could affect optical light transmission.

It is another object of the present invention to provide a new and improved method of fabricating an active region-less polymer modulator.

It is another object of the present invention to provide a new and improved active region-less polymer modulator with shaped adiabatic transition areas at each end of an EO polymer active component.

SUMMARY OF THE INVENTION

To achieve the desired objects and advantages of the present invention a polymer modulator including a semiconductor substrate with an insulating layer on an upper surface of the substrate is provided. A passive waveguide core is defined over the insulating layer and has a first passive region including a modulator light input, a second passive region including a modulator light output, and an active region optically coupling the first passive region and the second passive region to form a continuous passive waveguide core between the light input and the light output. The passive waveguide core in both the first passive region and the second passive region include one of sol-gel and $SiO_2$, and the passive waveguide core in both the first passive region and the second passive region is surrounded by cladding including one of sol-gel and $SiO_2$. The one of sol-gel and $SiO_2$ surrounding the passive waveguide core in both the first passive region and the second passive region has a first refractive index, the one of sol-gel and $SiO_2$ included in the passive waveguide core in both the first passive region and the second passive region has a second refractive index, and the second refractive index is at least 0.01 higher than the first refractive index. The passive waveguide core in the active region includes sol-gel, a lower cladding layer of sol-gel positioned between the insulating layer and the passive waveguide core in the active region, and the refractive index of the sol-gel passive waveguide core in the active region is at least 0.01 higher than the refractive index of the sol-gel in the lower cladding layer.

To further achieve the desired objects and advantages of the present invention a specific embodiment of a polymer modulator includes a semiconductor substrate with an insulating layer on an upper surface of the substrate. A passive waveguide core is defined over the insulating layer and has a first passive region defining a modulator light input, a second passive region defining a modulator light output, and an active region optically coupling the first passive region and the second passive region to form a continuous passive waveguide core between the light input and the light output. The passive waveguide core in both the first passive region and the second passive region include one of sol-gel and $SiO_2$, and the passive waveguide core in both the first passive region and the second passive region is surrounded by cladding including one of sol-gel and $SiO_2$. The one of sol-gel and $SiO_2$ surrounding the passive waveguide core in both the first passive region and the second passive region has a first refractive index, the one of sol-gel and $SiO_2$ included in the passive waveguide core in both the first passive region and the second passive region has a second refractive index, and the second refractive index is at least 0.01 higher than the first refractive index. The passive waveguide core in the active region includes sol-gel, a lower cladding layer of sol-gel partially surrounding the passive waveguide core in the active region, and the refractive index of the sol-gel passive waveguide core in the active region is at least 0.01 higher than the refractive index of the sol-gel in the lower cladding layer. The active region further includes a shaped electro-optic polymer active core component with a surface abutting a surface of the passive waveguide core in the active region and the shaped electro-optic polymer active core component is polled to align dipoles and promote modulation of light. The active region further includes an upper cladding layer of sol-gel joined with the lower cladding layer of sol-gel in the active region to surround the shaped electro-optic polymer active core and the passive waveguide core in the active region. The refractive index of the sol-gel waveguide core in the active region is at least 0.01 higher than the refractive index of the sol-gel in the upper cladding layer.

To further achieve the desired objects and advantages of the present invention a specific method of fabricating a polymer modulator includes the steps of providing a semiconductor substrate and forming an insulating layer on an upper surface of the substrate. The method further includes the step of defining a passive waveguide core on the insulating layer with a first passive region including a modulator light input, a second passive region including a modulator light output, and an active region optically coupling the first passive region and the second passive region to form a continuous passive waveguide core between the light input and the light output, and depositing one of sol-gel and $SiO_2$ in both the first passive region and the second passive region to form the passive waveguide core. The method further includes the step of depositing a cladding in both the first passive region and the second passive region including one of sol-gel and $SiO_2$ surrounding the passive waveguide core, the one of sol-gel and $SiO_2$ cladding surrounding the passive waveguide core in both the first passive region and the second passive region having a first refractive index, the one of sol-gel and $SiO_2$ included in the passive waveguide core in both the first passive region and the second passive region having a second refractive index, and the second refractive index being at least 0.01 higher than the first refractive index. The method further includes the step of depositing a lower cladding layer of sol-gel in the active region, depositing a sol-gel core in the active region on the lower cladding layer to form the passive waveguide core in the active region, and the refractive index of the sol-gel passive waveguide core in the active region is at least 0.01 higher than the refractive index of the sol-gel in the lower cladding layer. The method further includes the step of depositing a shaped electro-optic polymer active component with a surface abutting a surface of the sol-gel passive waveguide core in the active region, the shaped electro-optic polymer active component having a length that extends only within a modulation area defined by modulation electrodes. The method further includes the step of depositing an upper cladding layer over the shaped electro-optic polymer active component and exposed portions of the lower cladding layer of sol-gel in the active region, the upper cladding layer designed to produce adiabatic transition of light waves in the sol-gel core into the shaped electro-optic polymer active component to travel the length of the shaped electro-optic polymer active component and return to the sol-gel core.

BRIEF DESCRIPTION OF THE DRAWINGS

Specific objects and advantages of the invention will become readily apparent to those skilled in the art from the following detailed description of a preferred embodiment thereof, taken in conjunction with the drawings in which:

FIG. 9b is a cross sectional view through the active region in one of the arms of the Mach-Zehnder modulator of FIG. 5 as seen from the line c-c showing a truncated and reversed or downwardly slanted adiabatic transition area;

FIG. 11A is a cross sectional view through the active region in one of the arms of a Mach-Zehnder modulator of FIG. 5 as seen from the line c-c, showing an upwardly slanted and extended adiabatic transition area;

FIG. 11B is a cross sectional view through the active region in one of the arms of a Mach-Zehnder modulator of FIG. 5 as seen from the line c-c, showing a downwardly slanted and extended adiabatic transition area;

FIG. 28A is a cross-sectional view through an example of a first active region along one of the arms of the Mach-Zehnder modulator of FIG. 27 as seen from the line 28-28 showing an upwardly slanted adiabatic transition area with a digital grating in the upper surface;

FIG. 29A is a cross-sectional view through an example of a second active region along one of the arms of the Mach-Zehnder modulator of FIG. 27 as seen from the line 28-28 showing an upwardly slanted adiabatic transition area with a modified digital grating in the upper surface;

FIG. 29B is a cross-sectional view through an example of a second active region along one of the arms of the Mach-Zehnder modulator of FIG. 27 as seen from the line 28-28 showing a downwardly slanted adiabatic transition area with a modified digital grating in the lower surface;

FIG. 29C is a cross-sectional view similar to FIG. 29B showing a downwardly slanted adiabatic transition area with a digital grating in the lower surface extending through the adiabatic transition area;

FIGS. 33 (A)-(E) illustrate the adiabatic transition between the passive region and the active component for various different thicknesses of the active component;

FIGS. 34 (A)-(D) illustrate the adiabatic transition between the passive region and the active component for various different thicknesses of the passive region;

FIGS. 35 (A) and (B) illustrate the adiabatic transition between the passive region and the active component for different alignments of input light;

FIGS. 36-43 illustrate steps in a vertical taper EO waveguide fabrication process with an upwardly slanted adiabatic transition area;

FIGS. 44-48 illustrate steps in a vertical taper EO waveguide fabrication process with a downwardly slanted adiabatic transition area;

DETAILED DESCRIPTION OF THE DRAWINGS

Figure 1:
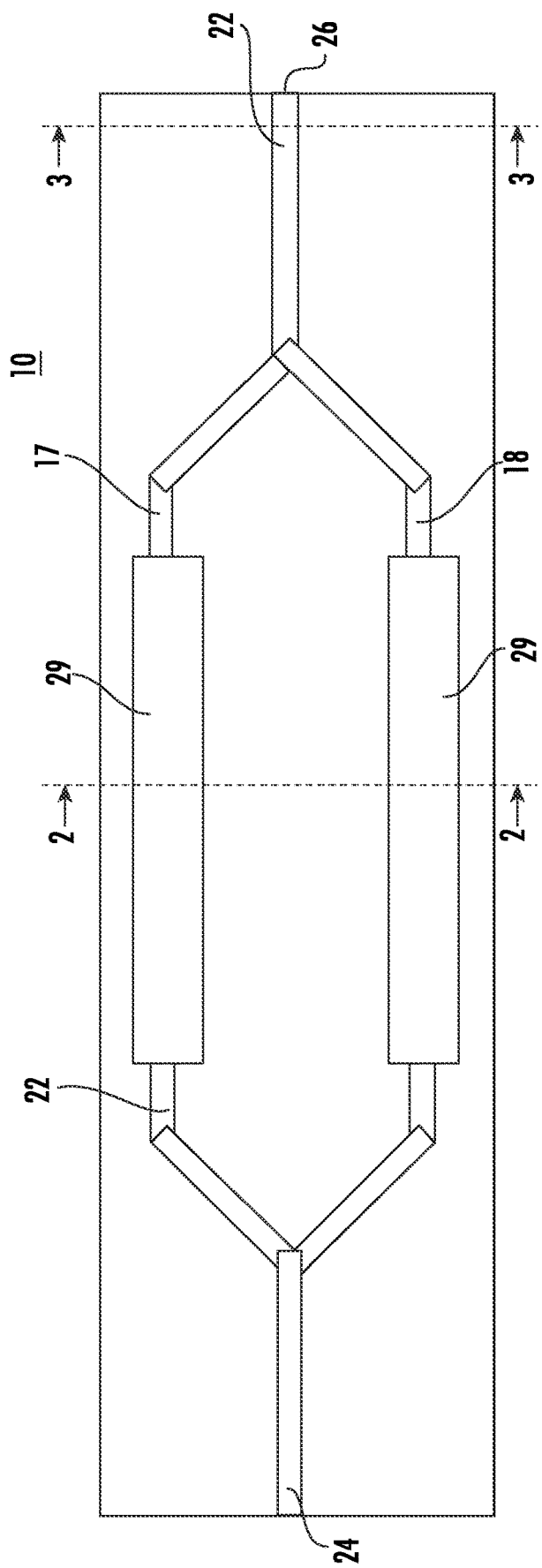
FIG. 1 is a top plan view of a prior art Mach-Zehnder modulator.
Figure 2:
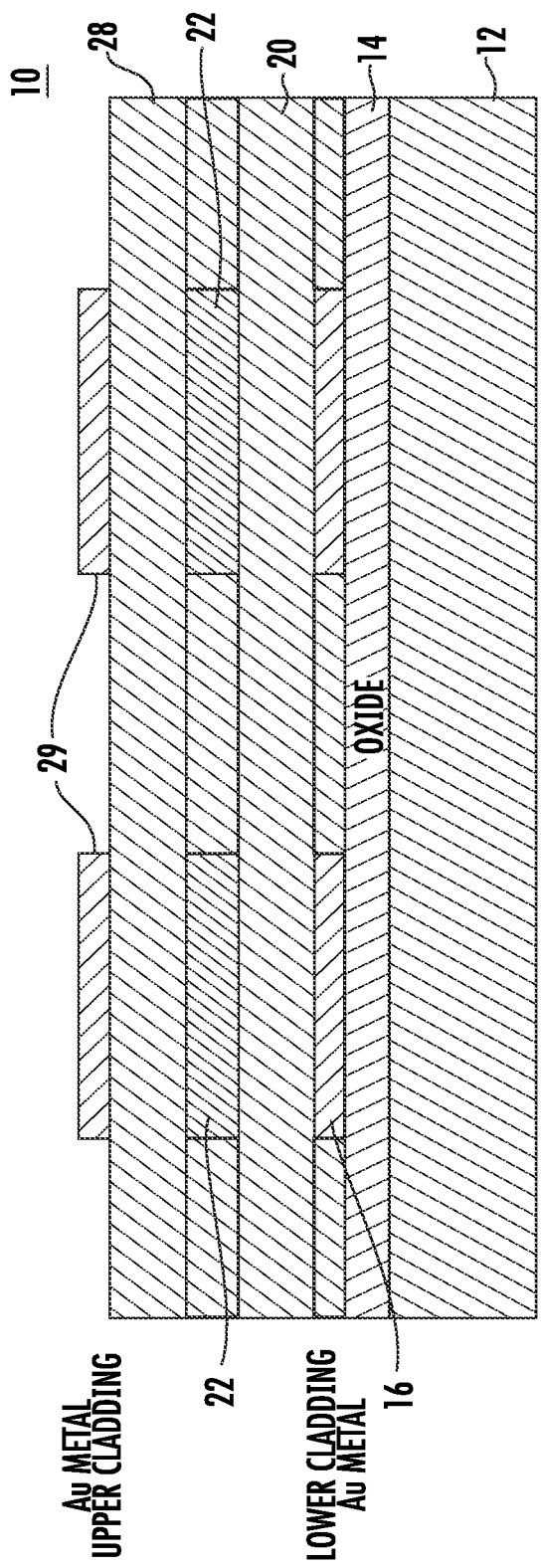
FIG. 2 is a cross sectional view of the Mach-Zehnder modulator of FIG. 1 as seen from the line 2-2.
Figure 3:
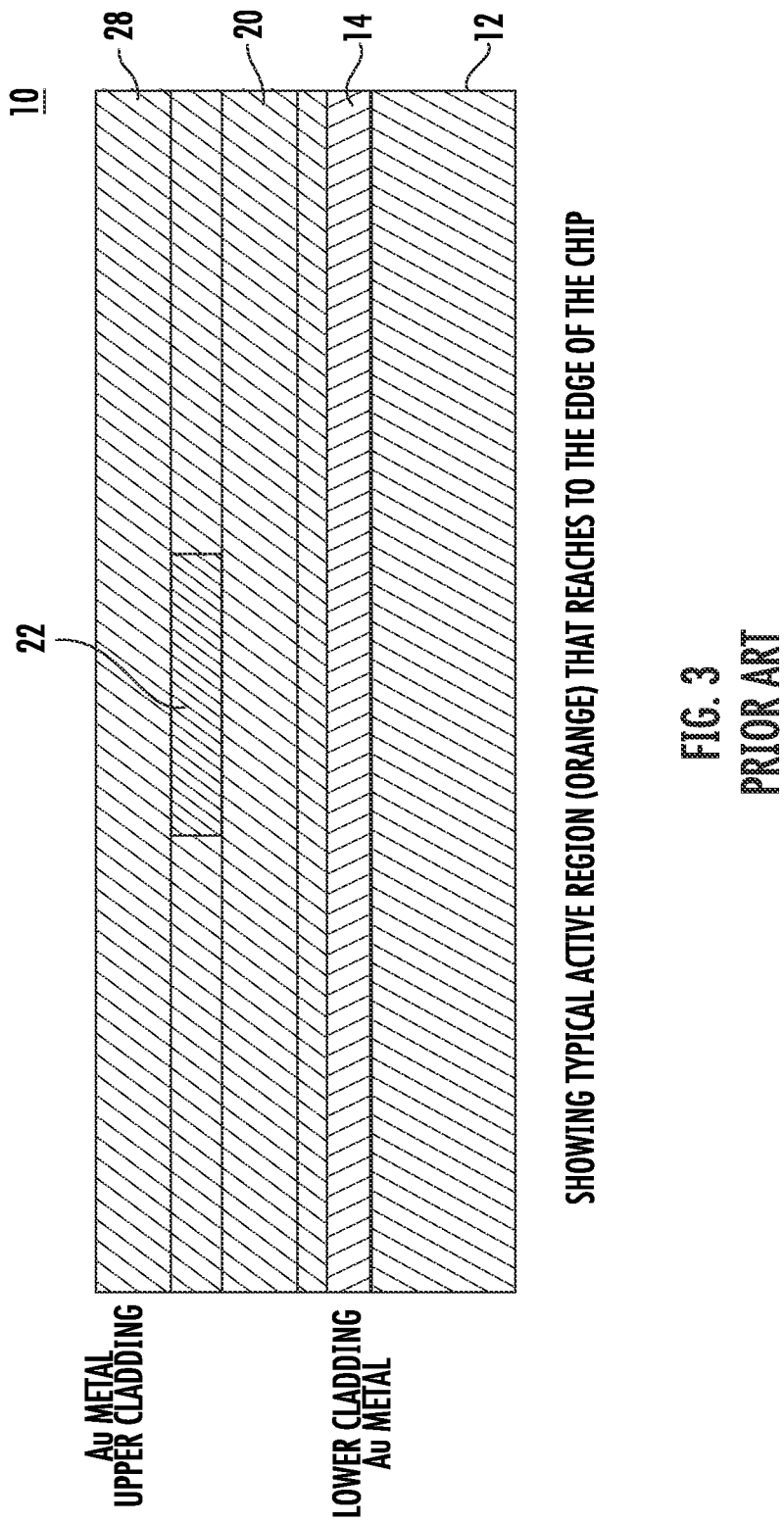
FIG. 3 is a cross sectional view of the Mach-Zehnder modulator of FIG. 1 as seen from the line 3-3.

Referring to FIGS. 1-3 a prior art Mach-Zehnder modulator 10 is illustrated. Modulator 10 is fabricated on a substrate 12 with an insulating layer 14 of an oxide, such as silicon oxide or the like. Lower electrodes 16 of some material, such as gold, are formed on layer 14 beneath portions of legs 17 and 18 of modulator 10. A lower cladding layer 20 is deposited over lower electrodes 16 and planarizes the structure. An active region 22 is deposited on lower cladding layer 20 and formed to extend from an optical input 24 to an optical output 26 with legs 17 and 18 formed therebetween. An upper cladding layer 28 is deposited over active region 22 and upper electrodes 29 are formed on upper cladding layer 28 overlying portions of legs 17 and 18 and lower electrode 16. As can be seen in FIGS. 1-3, the entire core of modulator 10 is composed of active polymer material. Thus, active region 22 transverses the complete modulator structure so that light being modulated enters directly into and exits directly out of the active region layer.

Because the prior art active region layer is limited in thickness and size, direct input and output coupling to optical fibers and free space light can be inefficient and require tight tolerances that increase cost and reduce efficiency.

Figure 4:
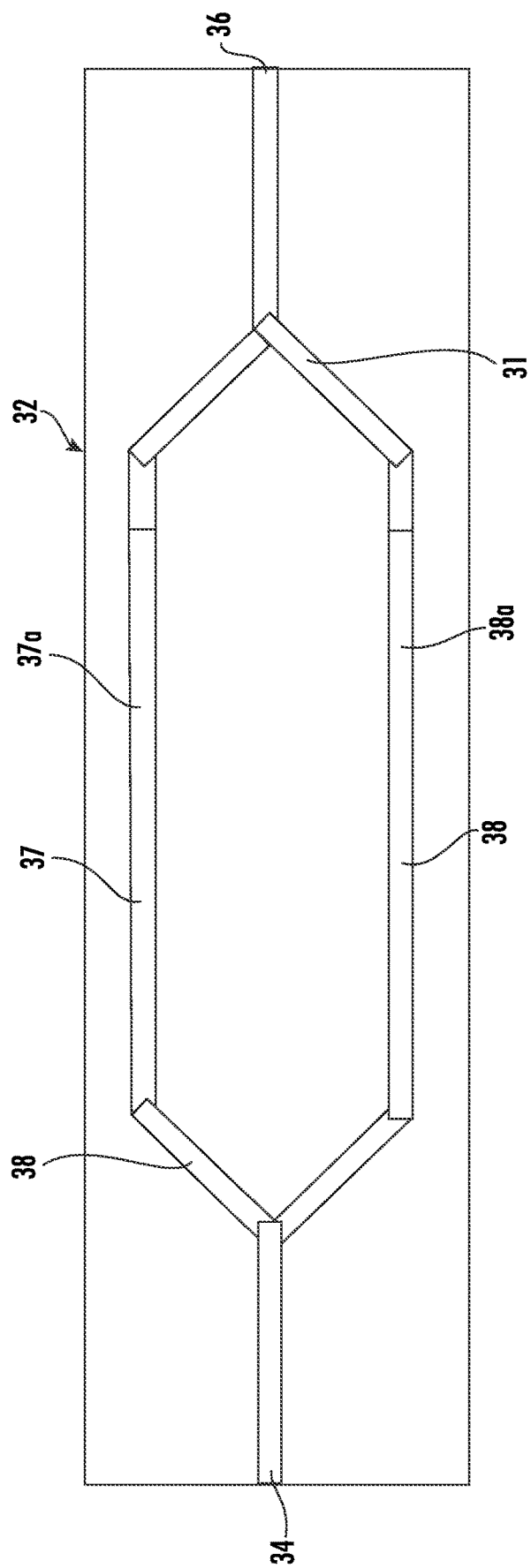
FIG. 4 is a top plan view of a passive core region in a Mach-Zehnder modulator, in accordance with the present invention.

Turning now to FIG. 4, a passive core region 32 for a Mach-Zehnder modulator 30 in accordance with the present invention is illustrated. In this example, passive core region 32 is formed to extend from an optical input 34, through a Y-branch 35, into legs 37 and 38, into another Y-branch 31, and to an optical output 36. Legs 37 and 38 include parallel central portions 37a and 38a which include the modulation area of modulator 30. Passive core region 32 can be any material that defines a core for a waveguide, other than an active polymer, and in this invention is designed for more efficient optical coupling to optical fibers and free space light. Because passive core region 32 is not active and not included in the modulation process, the dimensions are less critical and passive core region 32 can be fabricated with, for example, a larger cross-section. In this example passive core region 32 is sized larger for higher more tolerance alignment with single mode optical fibers.

Figure 5:
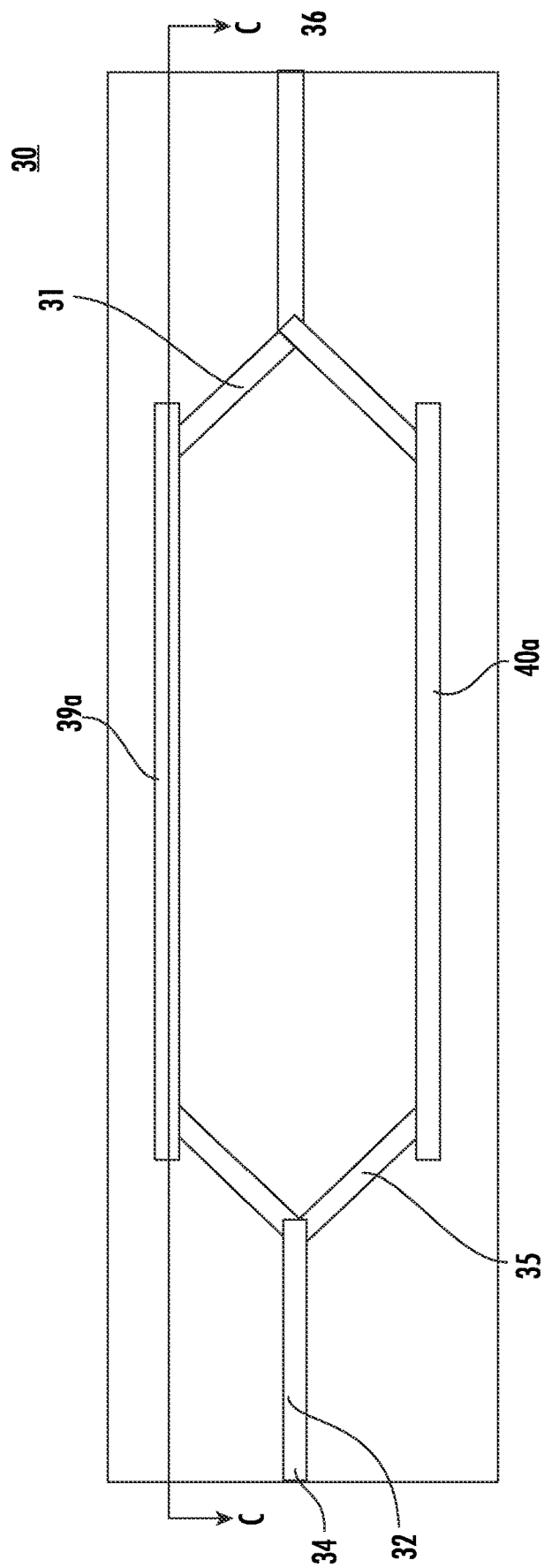
FIG. 5 is a top plan view of a first example of an active core region in a Mach-Zehnder modulator in accordance with the present invention.

Referring additionally to FIG. 5, a first example of shaped active components 39a and 40a are formed on passive core region 32 and overlying central portions 37a and 38a of legs 37 and 38. Shaped active components 39a and 40a are preferably fabricated with a host-guest system made of a host polymer and a guest chromophore. The active component is the electro-optic guest-host that is poled to align dipoles that will promote the modulation of light with electrical energy (i.e. active component). Additional poling information can be found in a copending U.S. Patent Application entitled "Polymer Modulator and Laser Integrated on a Common Platform and Method", Ser. No. 15/692,080, filed 31 Aug. 2017 and included herein by reference. Active components 39 and 40 are confined within the periphery of the chip and do not reach the outside edges.

While in this disclosure the shaped active components are disclosed as overlying central portions of the passive core region, it should be understood that it is possible, with some additional effort, to situate the shaped active components in underlying relationship to central portions of the passive core region. Such an arrangement might not operate as well as the disclosed structure but might be preferable in some specific applications. To this end, one of an upper or lower cladding layer may be referred to as a first cladding layer and the other may be referred to as a second cladding layer. Also, while a Mach-Zehnder modulator is used in the following examples as a preferred structure for the use of the present invention, it should be understood that other circuits, modulators and the like may benefit from the novel concept.

Figure 6:
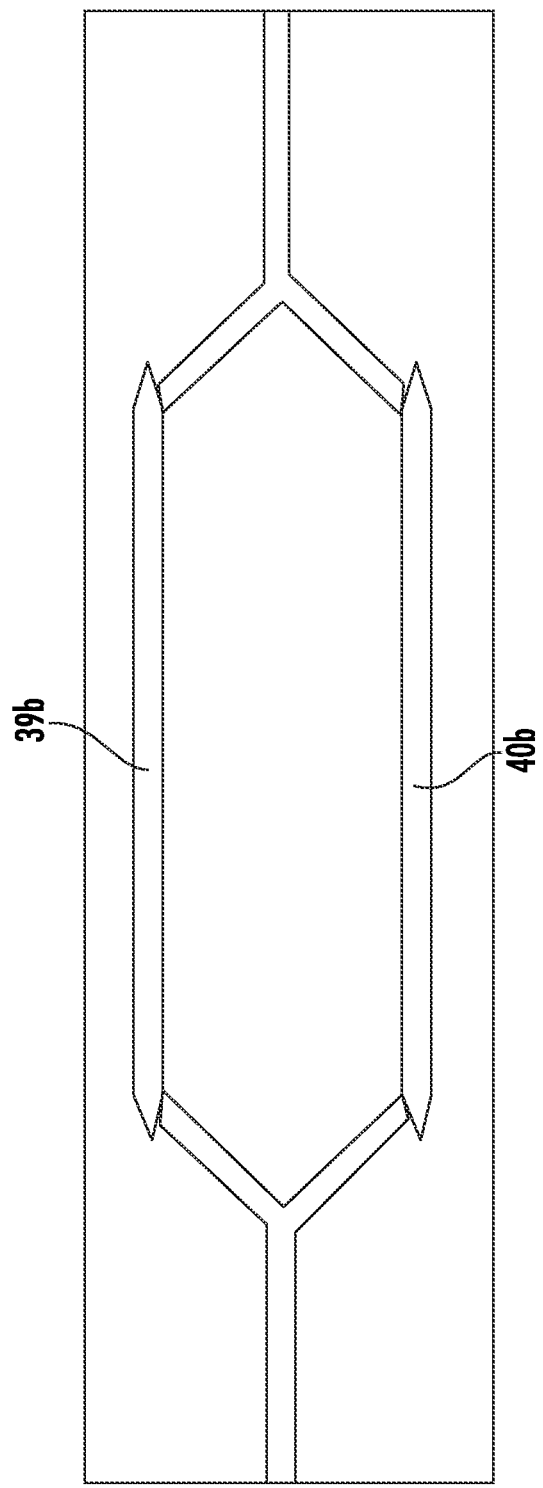
FIG. 6 is a top plan view of a second example of an active core region in a Mach-Zehnder modulator in accordance with the present invention.
Figure 7:
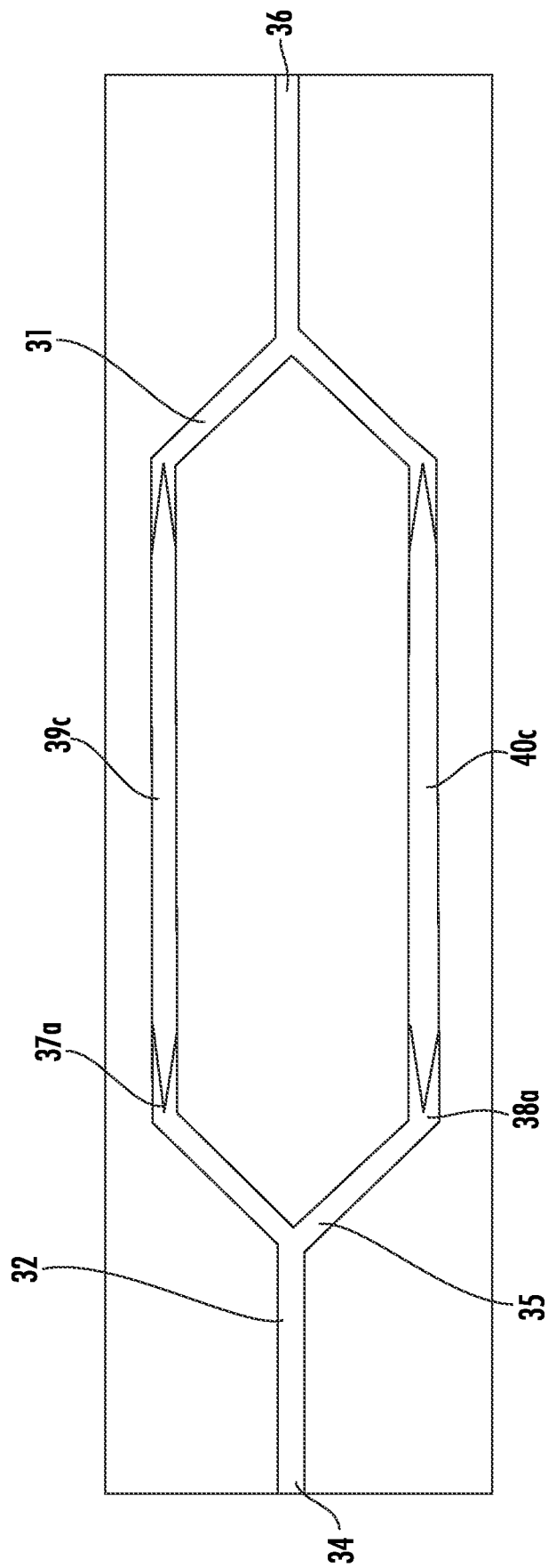
FIG. 7 is a top plan view of a third example of an active core region in a Mach-Zehnder modulator, illustrating that active regions can be shaped and the length can be varied.

Referring additionally to FIGS. 6 and 7, additional examples of shaped active components (39b/40b and 39c/40c, respectively) are illustrated in top plan views formed on passive core region 32 and overlying central portions 37a and 38a of legs 37 and 38. Also, FIGS. 8-11 illustrate side views of examples of shaped active components 39 and 40. The additional examples illustrate that active regions can be formed in a variety of shapes and the lengths can be varied in accordance with the specific application. It will be understood that the shape of the active components ends can be pointed or curved and the angle and shape can be varied from an optimum of 1 degree from the horizontal, with a preferred angle in a range of 0.5 degrees to 5 degrees. Note that both ends of the shaped active components 39 and 40 (e.g. in FIG. 10) have upper and lower adiabatic transitions.

Figure 8A:
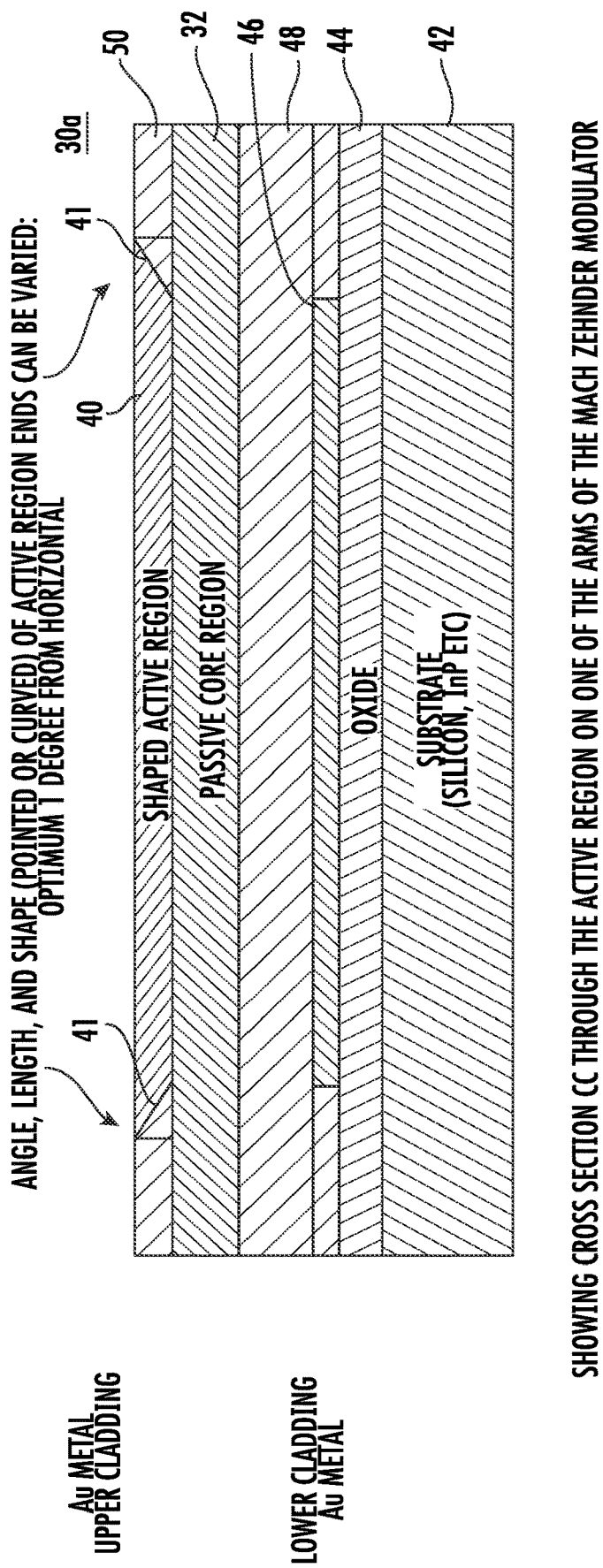
FIG. 8A is a cross sectional view through the active region in one of the arms of the Mach-Zehnder modulator of FIG. 5 as seen from the line c-c showing an upwardly slanted adiabatic transition area.

Turning specifically to FIG. 8A, the various components of Mach-Zehnder modulator 30 are illustrated in more detail. A substrate 42 of a semiconductor material, such as silicon, InP, or the like, is provided which allows Mach-Zehnder modulator 30 to be integrated directly into other electronic circuitry. An insulating layer 44 of an oxide, such as silicon oxide or the like, is deposited or formed on substrate 42. Lower or ground electrode 46 of some material, such as gold, is formed on insulating layer 44 at least beneath central portions 37a and 38a of legs 39 and 40 of modulator 30. A lower cladding layer 48 is deposited over lower electrode 46 and planarizes the structure. Passive core region 32 is deposited on lower cladding layer 48 with a lower surface abutting an upper surface of lower cladding layer 48. A side cladding layer 49 (see FIG. 30 (D)) is deposited beside passive core region 32 to planarize the structure. A shaped portion 50 of an upper cladding layer 52 is deposited over passive core region 32 and side cladding layer 49 and shaped active components 39 and 40 are deposited over passive core region 32 between shaped portion 50 of upper cladding layer 52. In this specific embodiment shaped active components 39 and 40 have upwardly slanted adiabatic transition areas 41 formed at each end. Shaped active components 39 and 40 have lower surfaces that abut upper surfaces of passive core region 32. A remaining portion of upper cladding layer 52 is deposited to enclose shaped active components 39 and 40 and has a lower surface that abuts an upper surface of shaped active components 39 and 40. It should be understood that shaped portion 50 and shaped active components 39 and 40 can be deposited in any order commensurate with the particular shapes selected.

Figure 8B:
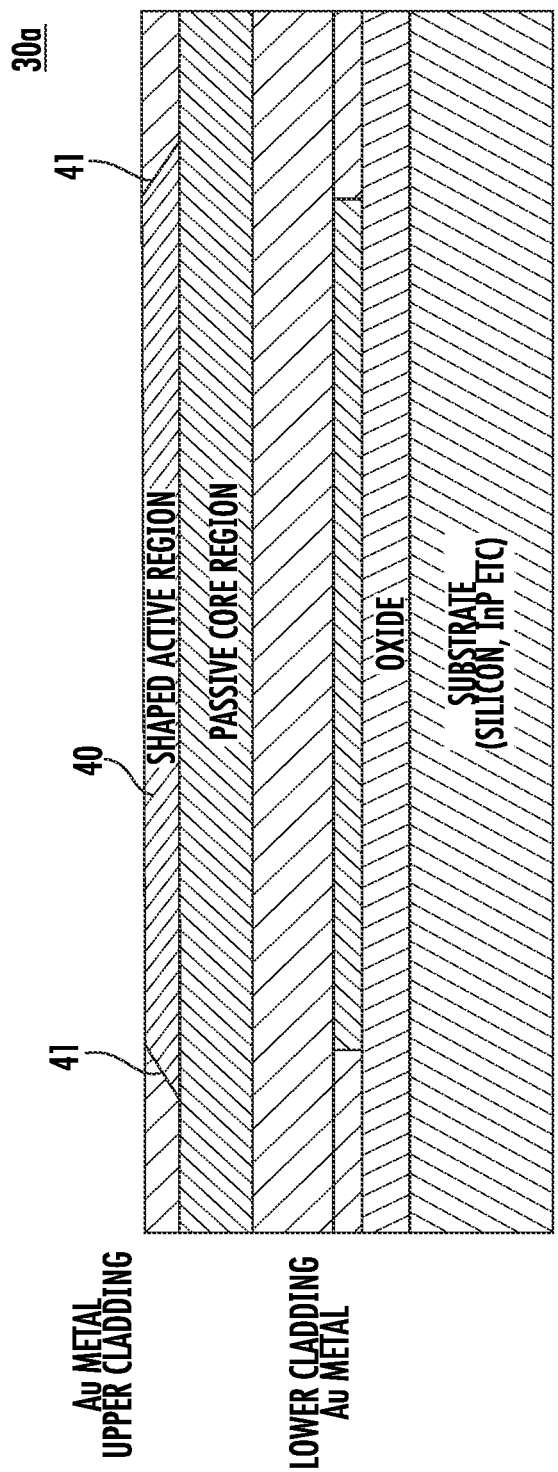
FIG. 8b is a cross sectional view through the active region in one of the arms of the Mach-Zehnder modulator of FIG. 5 as seen from the line c-c showing a reversed or downwardly slanted adiabatic transition area.

Referring additionally to FIG. 8B, a Mach-Zehnder modulator 30 similar to that shown in FIG. 8A is illustrated. In this specific embodiment, slanted adiabatic transition areas 41 are slanted downwardly relative to the upper surface. In all instances of the slanted adiabatic transition areas, the adiabatic transition is accomplished using an angle of about 1 degree in the active region. However, this angle can range from about 0.5 degrees to 5 5 degrees, although other angles up to 90 degrees to the horizontal could be used. Optical mode confinement is dependent on the angle of the adiabatic transition area, thickness of the active and passive region layers, and material characteristics such as refractive index, and lateral dimensions. As demonstrated by the various illustrations and descriptions included herein, various shapes and lengths of the adiabatic transition area can be designed both in width and height (length).

Figure 9A:
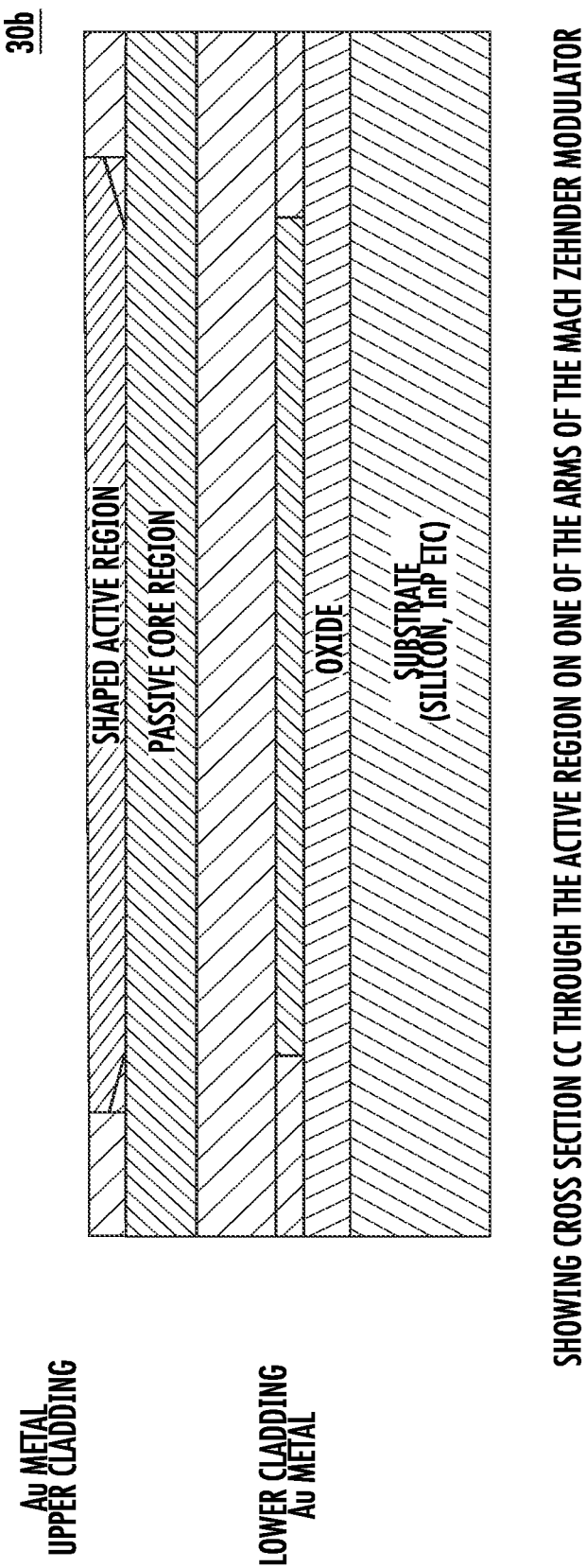
FIG. 9A is a cross sectional view through the active region in one of the arms of the Mach-Zehnder modulator of FIG. 5 as seen from the line c-c showing a truncated upwardly slanted adiabatic transition area.
Figure 10:
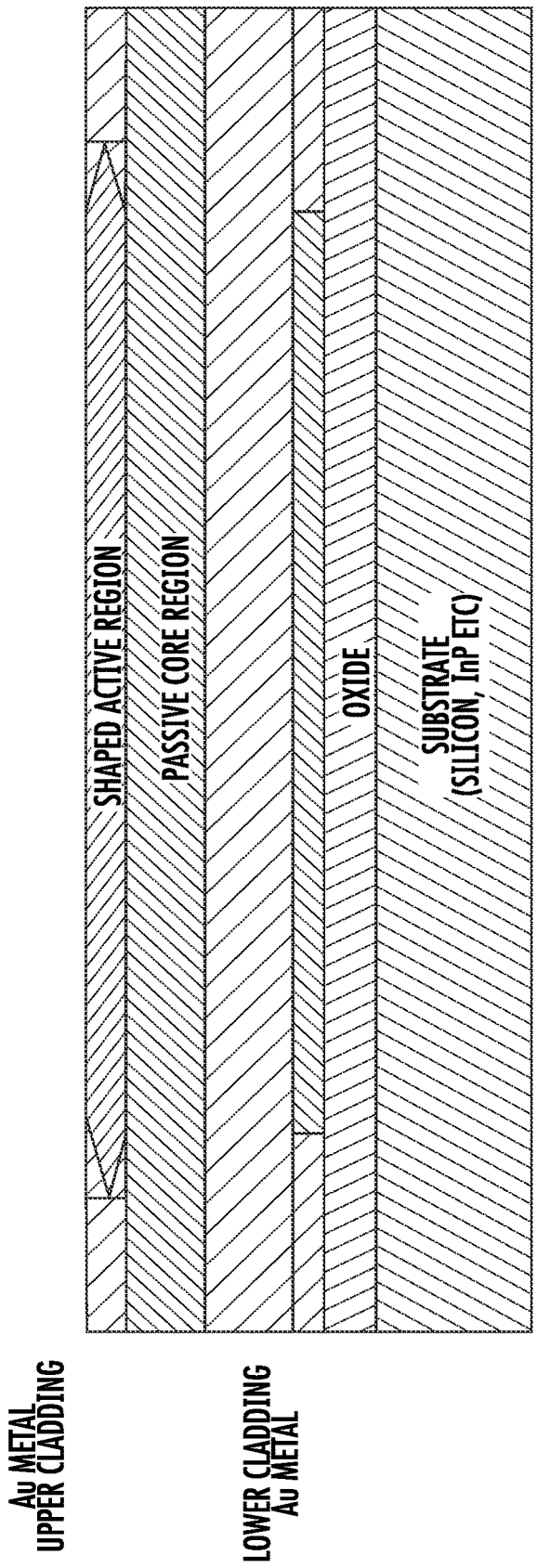
FIG. 10 is a cross sectional view through the active region in one of the arms of the Mach-Zehnder modulator of FIG. 5 as seen from the line c-c showing slanted upper and lower adiabatic transition areas.

To further illustrate some exemplary embodiments of the adiabatic transition area, FIGS. 9A and 9B illustrate a Mach-Zehnder modulator 30b with shaped active components having upwardly slanted and downwardly slanted adiabatic transition areas, respectively, with truncated ends. FIG. 10 illustrates a Mach-Zehnder modulator 30c with shaped active components each end having upwardly and downwardly slanted adiabatic transition areas. FIGS. 11A and 11B illustrate a Mach-Zehnder modulator 30e with shaped active components having upwardly slanted and downwardly slanted adiabatic transition areas, respectively, with extended ends or slanted at a smaller angle to the horizontal.

Figure 12:
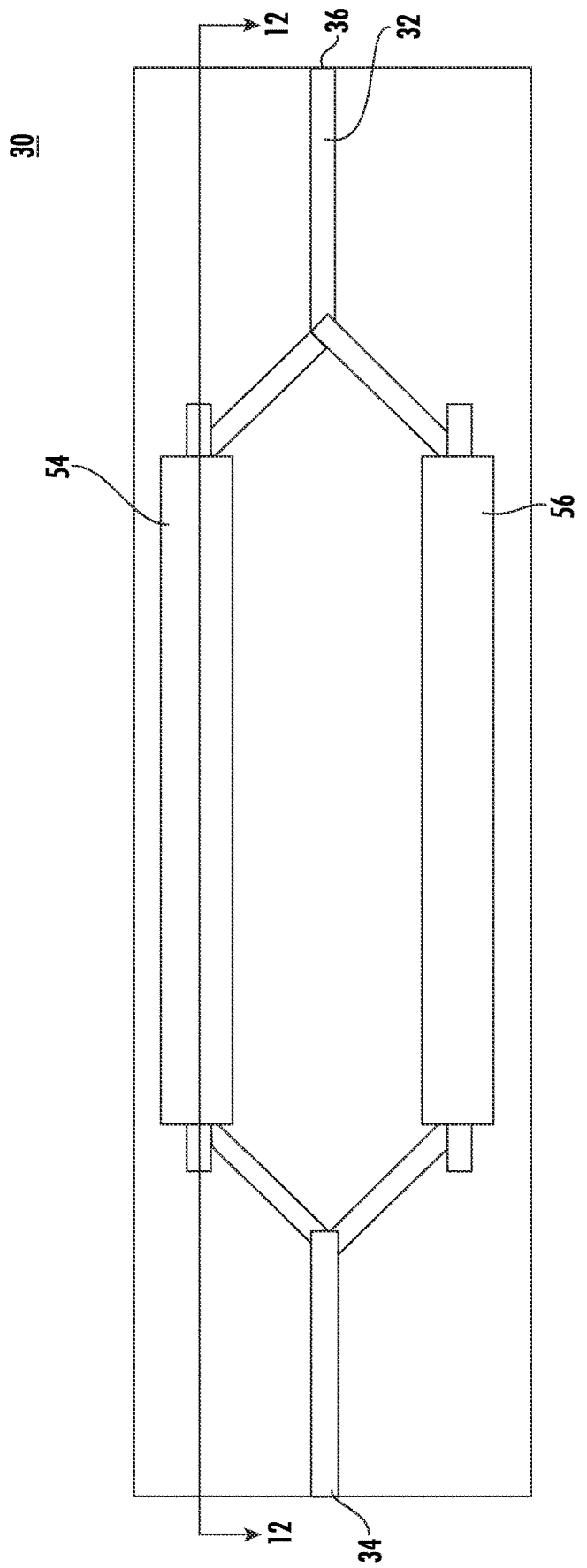
FIG. 12 is a top plan view of the Mach-Zehnder modulator of FIG. 8 with upper electrodes in accordance with the present invention.
Figure 13A:
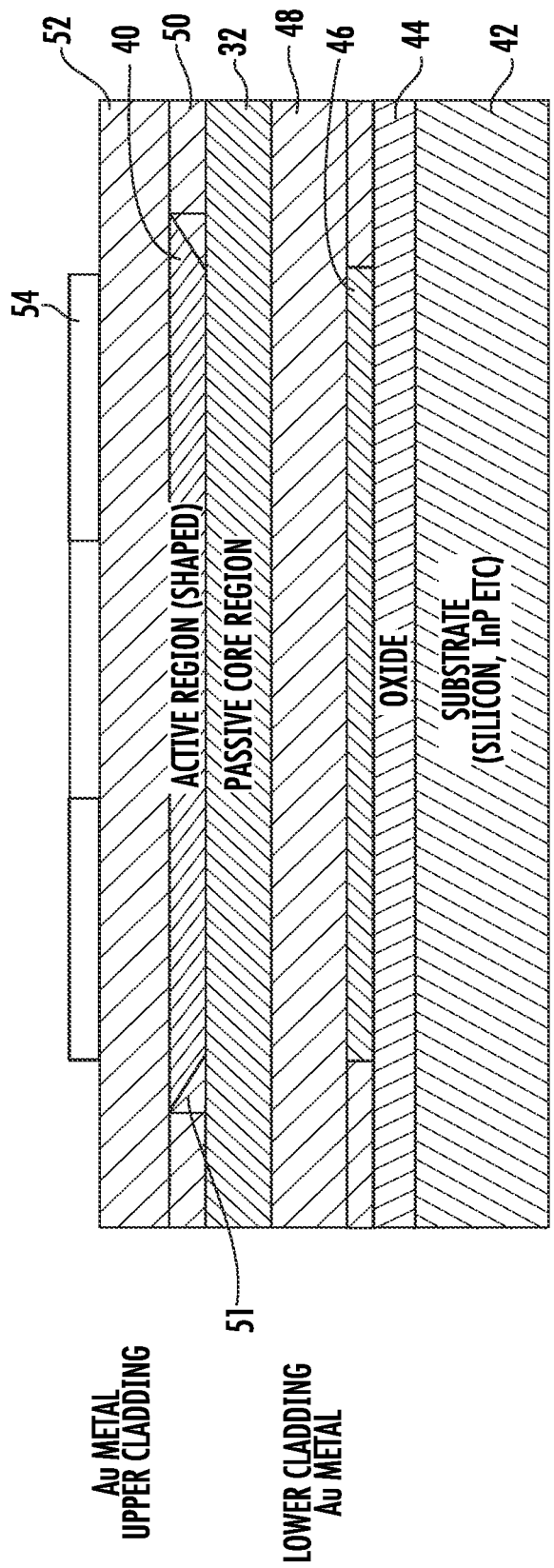
FIG. 13A is a cross sectional view of the Mach-Zehnder modulator of FIG. 8 as seen from the line 9-9 in FIG. 12 showing an upwardly slanted adiabatic transition area.
Figure 13B:
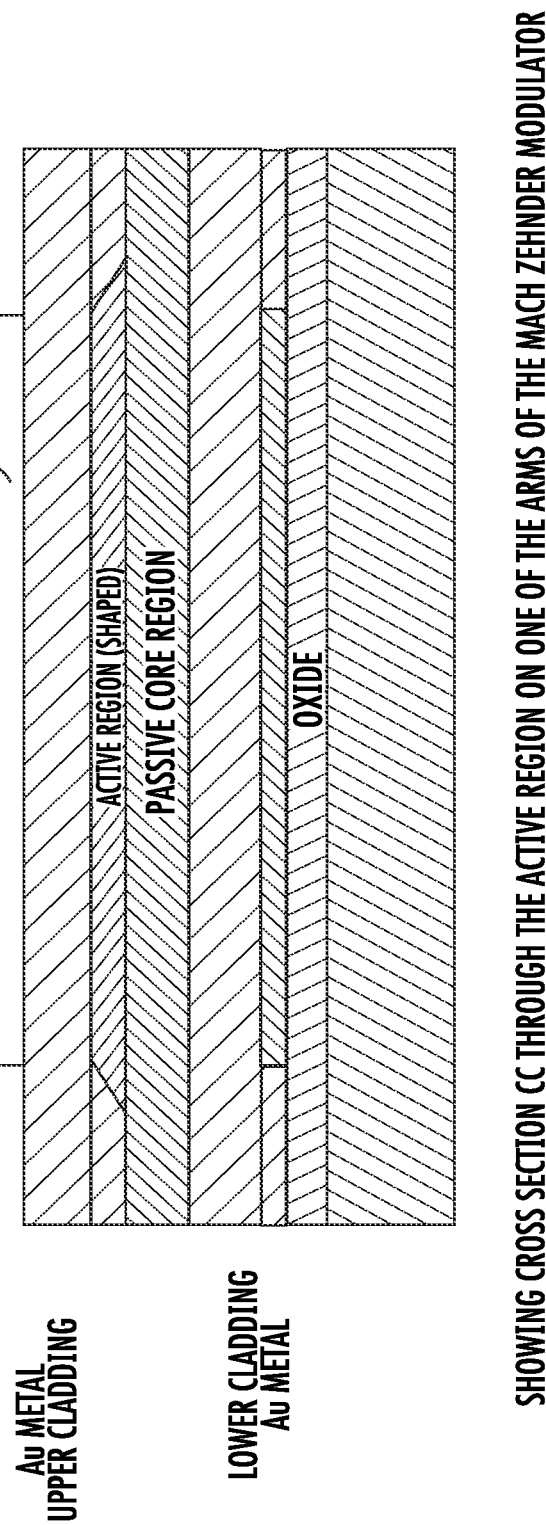
FIG. 13B is a cross sectional view of the Mach-Zehnder modulator of FIG. 8 as seen from the line 9-9 in FIG. 12 showing a downwardly slanted adiabatic transition area.

Referring specifically to FIGS. 12 and 13A and 13B, upper electrodes 54 and 56 are formed on upper cladding layer 52 overlying portions of shaped active components 39 and 40 and lower electrode 46. Upper electrodes 54 and 56 are preferably formed of some easily deposited metallic material such as gold or the like. Upper cladding regions 50 and 52 are designed to allow adiabatic transition of the input optical wave up from passive region core 32 to active components 39 and 40 and back down to passive region core 32 for exiting the modulator. In this disclosure the term "adiabatic transition' is defined as meaning a transition of light from one region to another with substantially no loss or gain of energy. In FIG. 13A, the adiabatic transition area is slanted upwardly relative to the horizontal. In FIG. 13B, the adiabatic transition area is slanted downwardly relative to the horizontal.

In the operation of modulator 30, referring again to FIGS. 12 and 13A and 13B (for example), the main mode of single mode light enters passive core region 32 at optical input 34 and travels from left to right. The main optical mode travels until it sees a higher refractive index than the refractive index of passive core region 32. In modulator 30, as an example, the refractive index of passive core region 32 is 1.5 and the refractive index of shaped active components 39 and 40 is 1.7. In modulator 30, as the main optical mode travels to the right, it slowly sees the higher refractive index of the shaped active components 39 and 40, because of the slanted or angled portion 51 of shaped portion 50 of upper cladding layer 52, and slowly leaks into the higher refractive index material as active components 39 and 40 are brought closer to passive core region 32. The slanted portion 51 of shaped portion 50 is defined herein as an adiabatic transition and the angle determines the amount or speed with which the main optical mode leaks into active components 39 and 40. Preferably the angle of slanted portion 51 is about 0.4 degrees to 1 degree to the horizontal although the main optical mode will leak at higher angles (e.g. up to 30 degrees) but lots of light will be lost. Also, it should be noted that either upwardly slanted or downwardly slanted adiabatic transition areas will produce the optical mode leak into and out of the active components. To maintain a good leakage to higher order material, a slow adiabatic transition is preferred from the passive region to the active component and then back down to the passive region at the opposite ends of active components 39 and 40.

Figure 14:
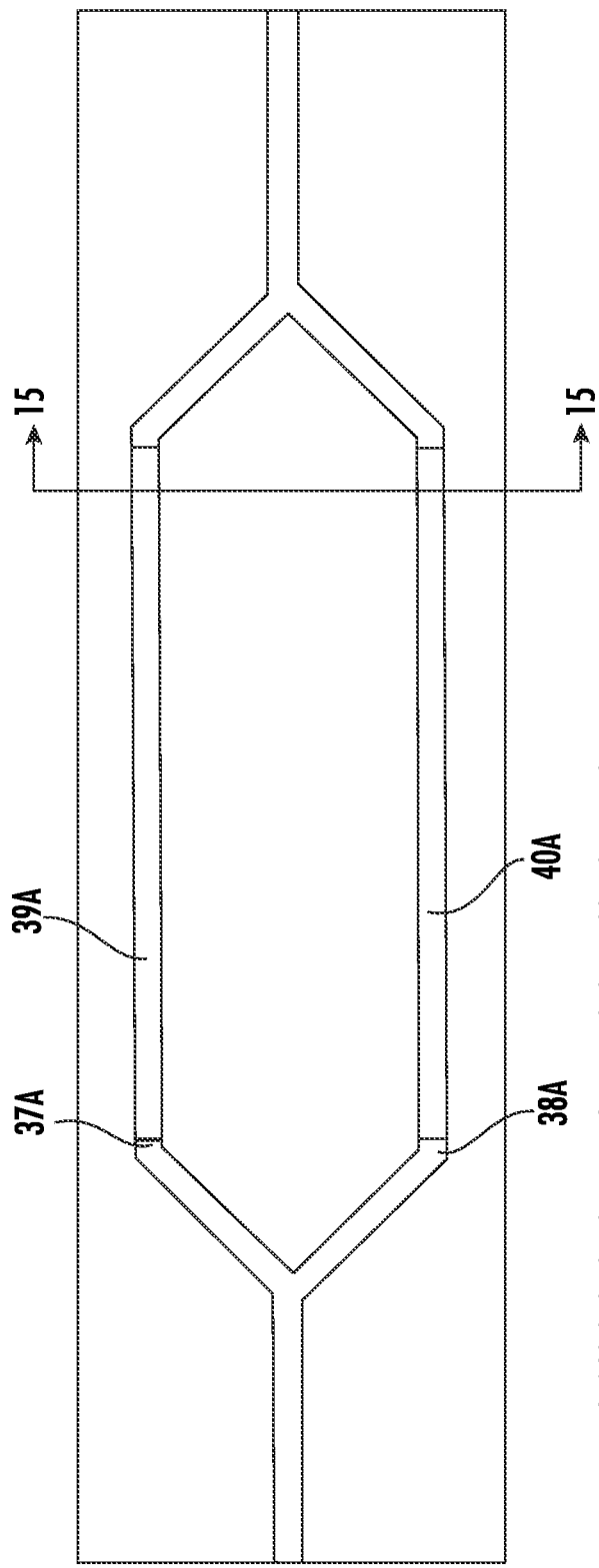
FIG. 14 is a top plan view of a third example of an active core region in a Mach-Zehnder modulator in accordance with the present invention.
Figure 15:
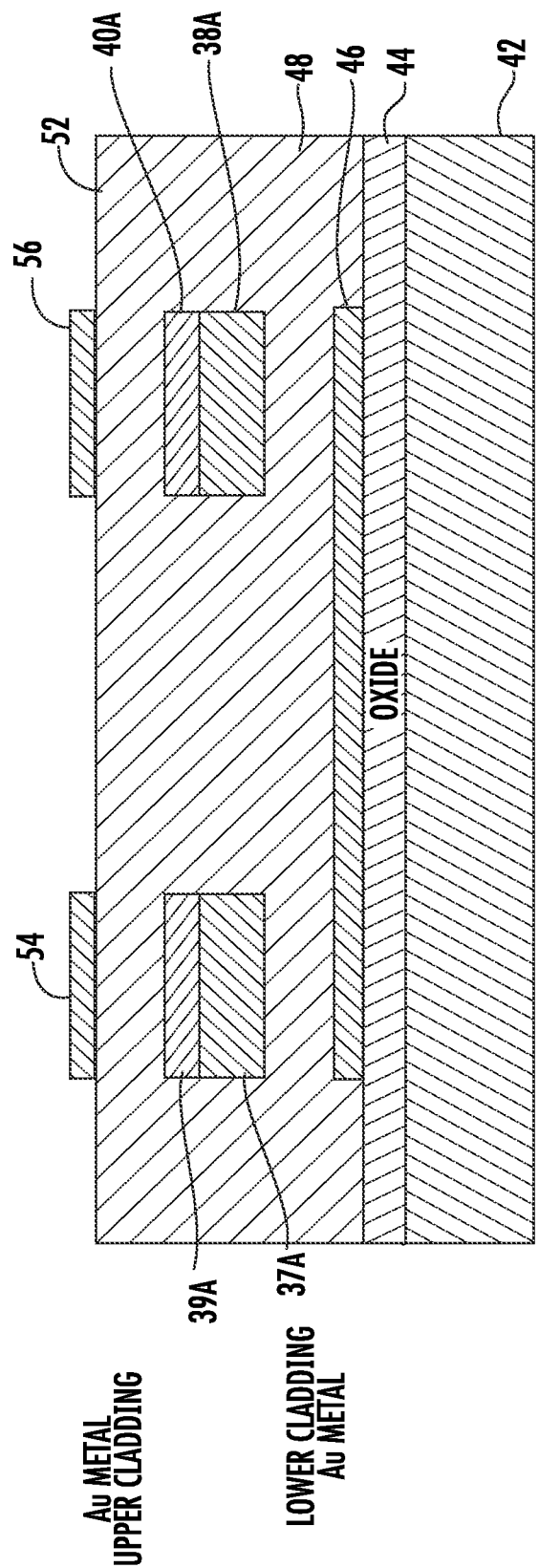
FIG. 15 is a cross-sectional view of the Mach-Zehnder modulator of FIG. 14 as seen from the line 15-15.

Turning to FIGS. 14-26, several examples are illustrated showing the relative positions of the various components in the mid-area of a Mach-Zehnder modulator (e.g. modulator 30). In each example, since only the relative positions of passive core regions 37 and 38 and active core regions or components 39 and 40 change, to maintain continuity similar components will be designated with similar numbers and the passive core regions and active core regions will be designated with similar numbers and a letter will be added to indicate the different example. Referring specifically to FIGS. 14 and 15, passive core regions 37A and 38A are rectangular in cross-section and active core regions or components 39A and 40A are deposited as a uniform layer on the upper surface. Details as to the ends of active core regions or components 39A and 40A are not shown, since any of the above examples, or others, can be used.

Figure 16:
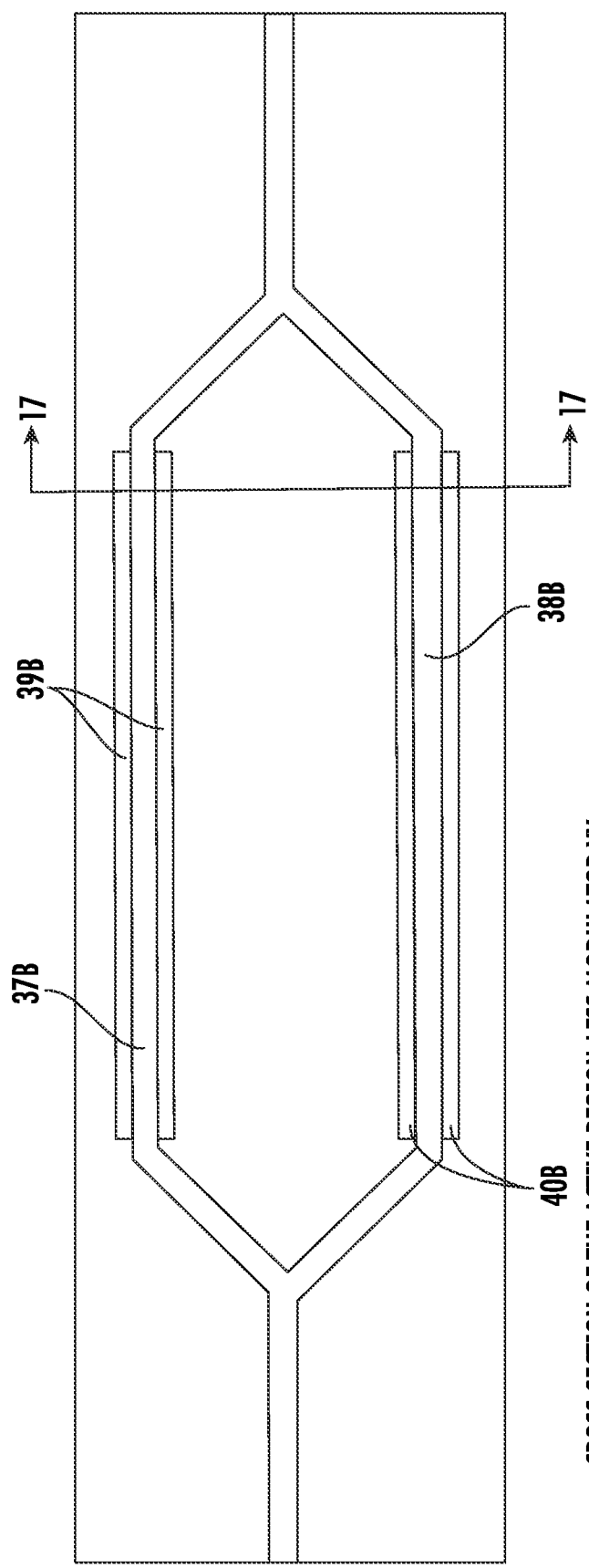
FIG. 16 is a top plan view of a fourth example of an active core region in a Mach-Zehnder modulator in accordance with the present invention.
Figure 17:
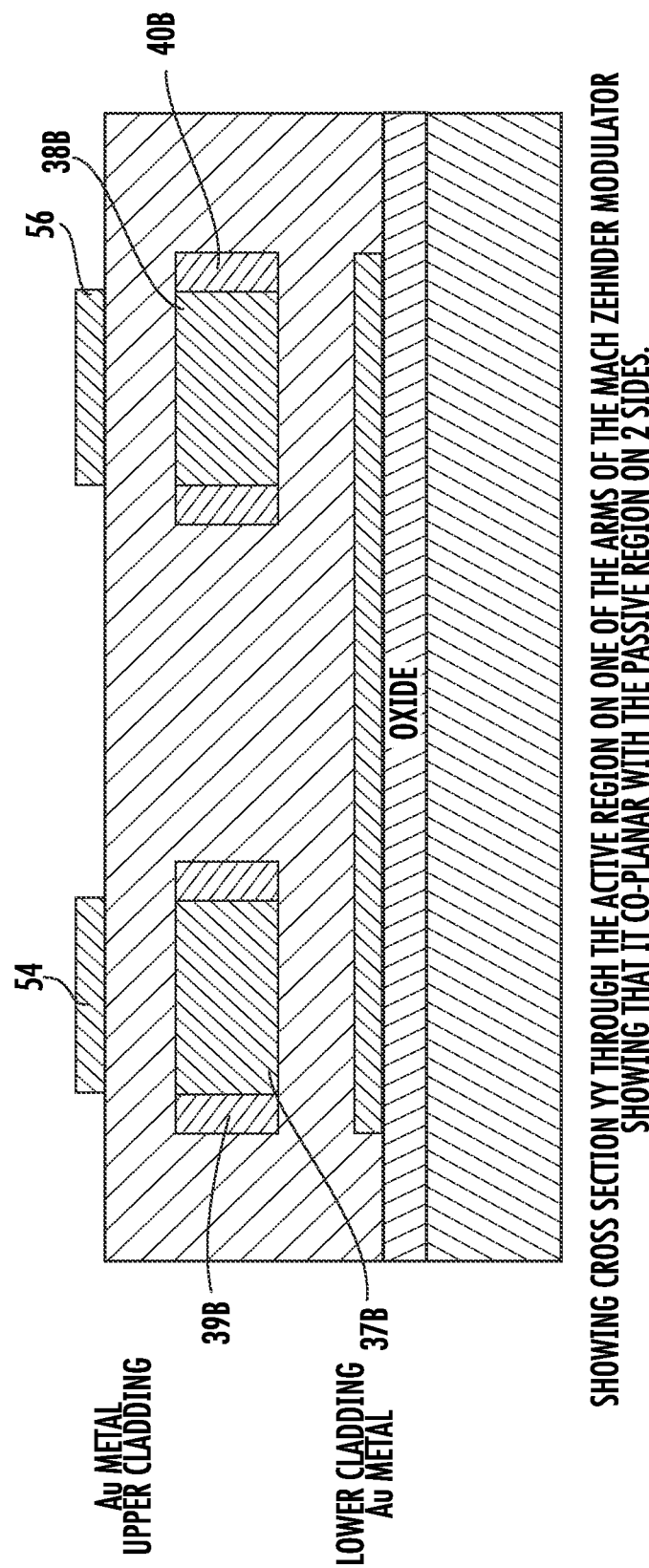
FIG. 17 is a cross-sectional view of the Mach-Zehnder modulator of FIG. 16 as seen from the line 17-17.
Figure 18:
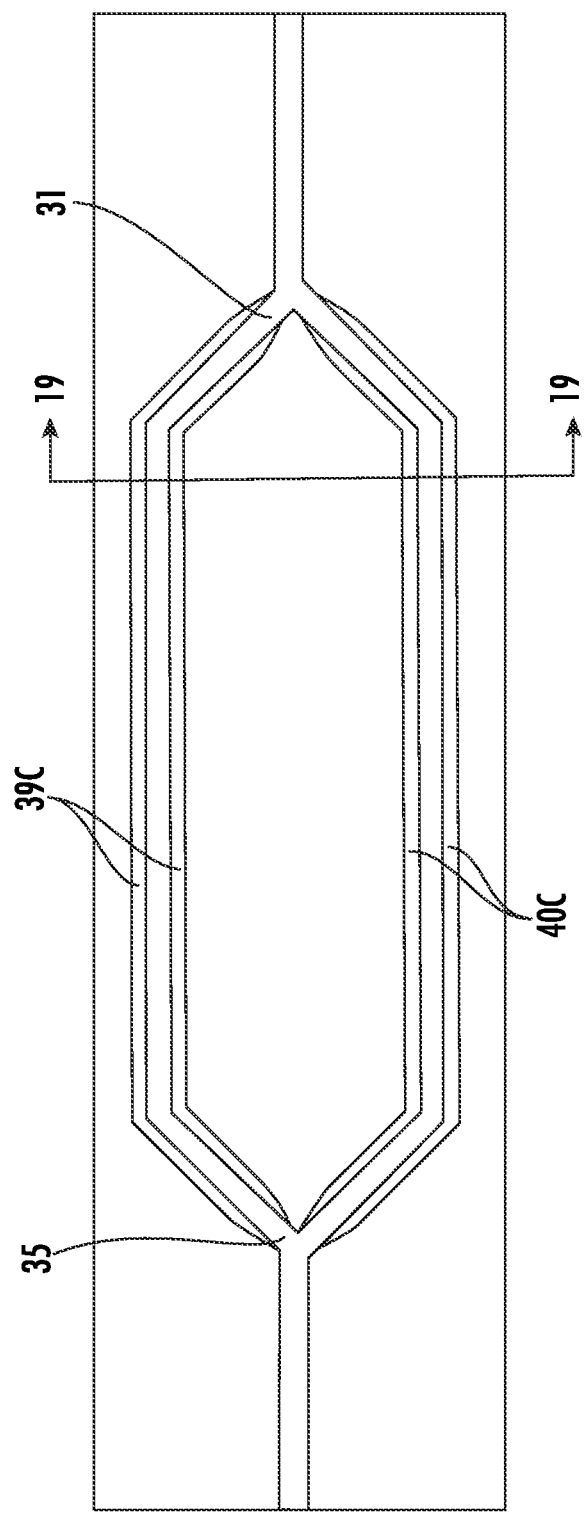
FIG. 18 is a top plan view of a fifth example of an active core region in a Mach-Zehnder modulator in accordance with the present invention.
Figure 19:
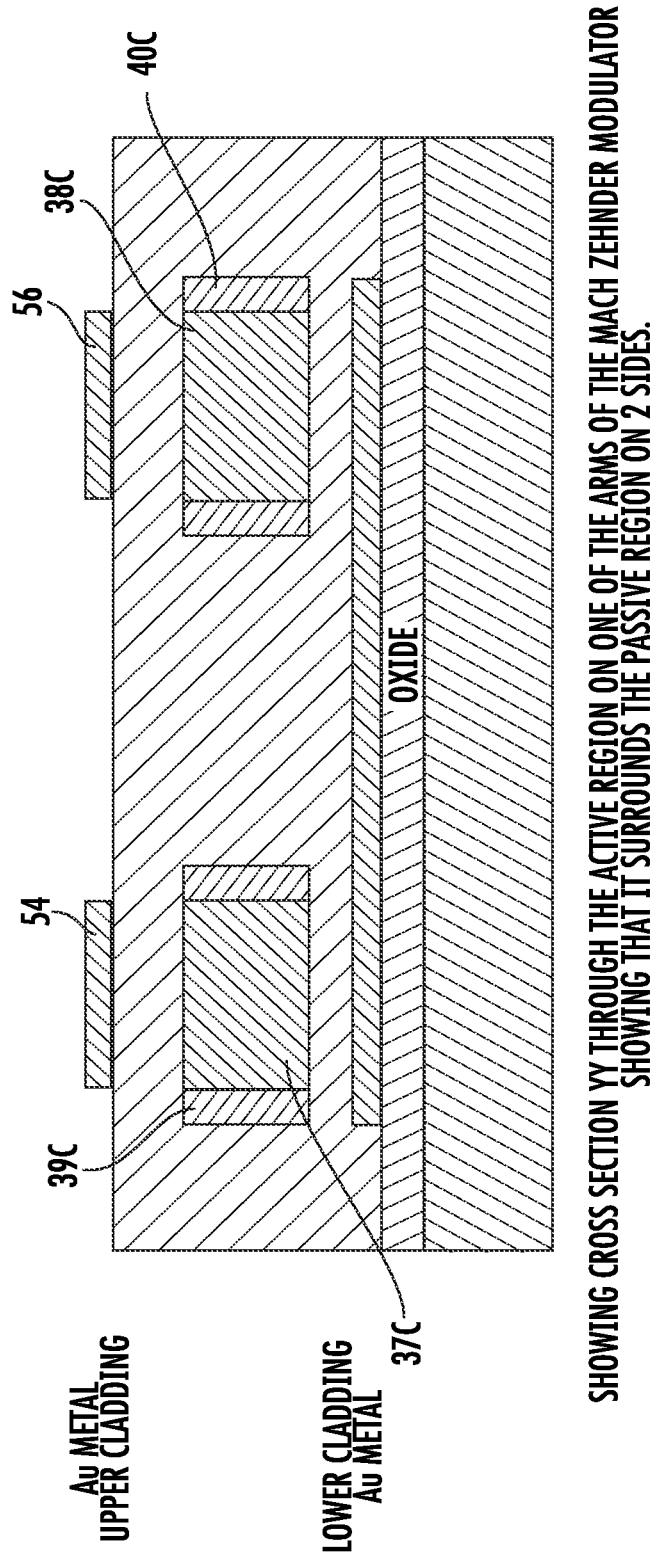
FIG. 19 is a cross-sectional view of the Mach-Zehnder modulator of FIG. 16 as seen from the line 18-18.

Referring specifically to FIGS. 16 and 17, passive core regions 37B and 38B are rectangular in cross-section and active core regions or components 39B and 40B are deposited as a uniform layer on opposite vertical sides, basically sandwiching the passive region between two layers of active region. Again, details as to the ends of active core regions or components 39B and 40B are not shown, since any of the above examples, or others, can be used. The example illustrated in FIGS. 18 and 19 is essentially the same as the example in FIGS. 16 and 17, except that active core regions or components 39C and 40C extend around the corners and onto portions of Y-branches 35 and 31.

Figure 20:
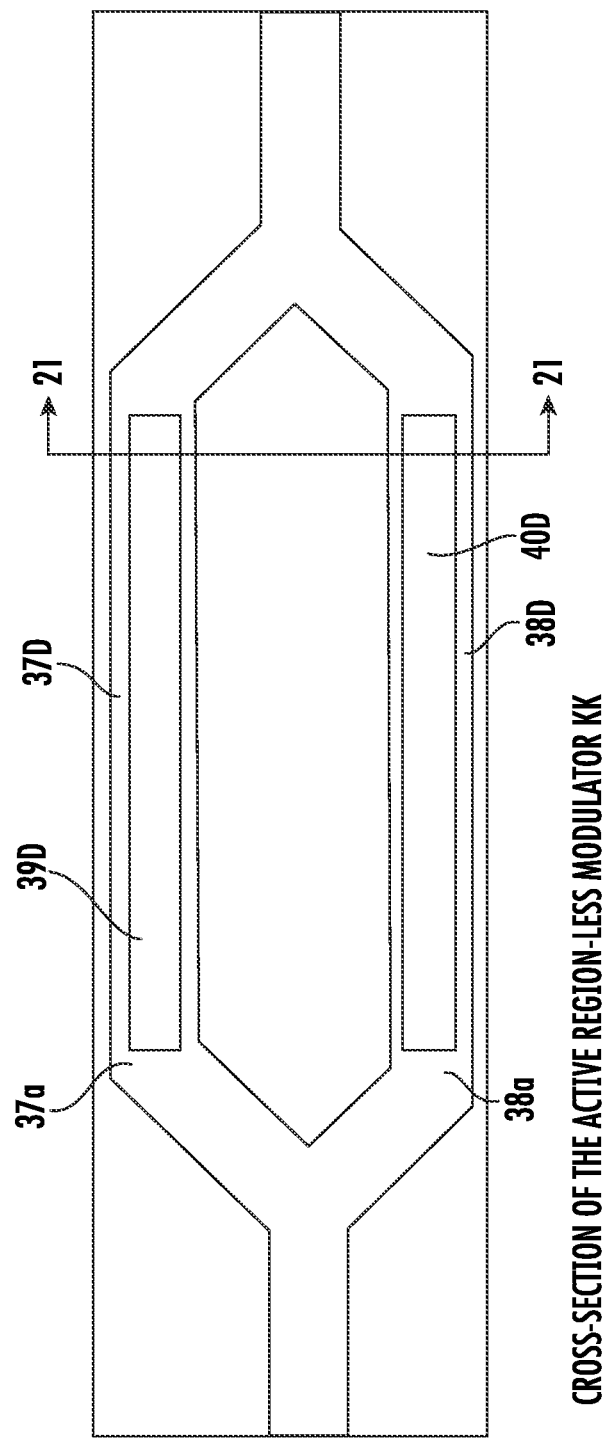
FIG. 20 is a top plan view of a sixth example of an active core region in a Mach-Zehnder modulator in accordance with the present invention.
Figure 21:
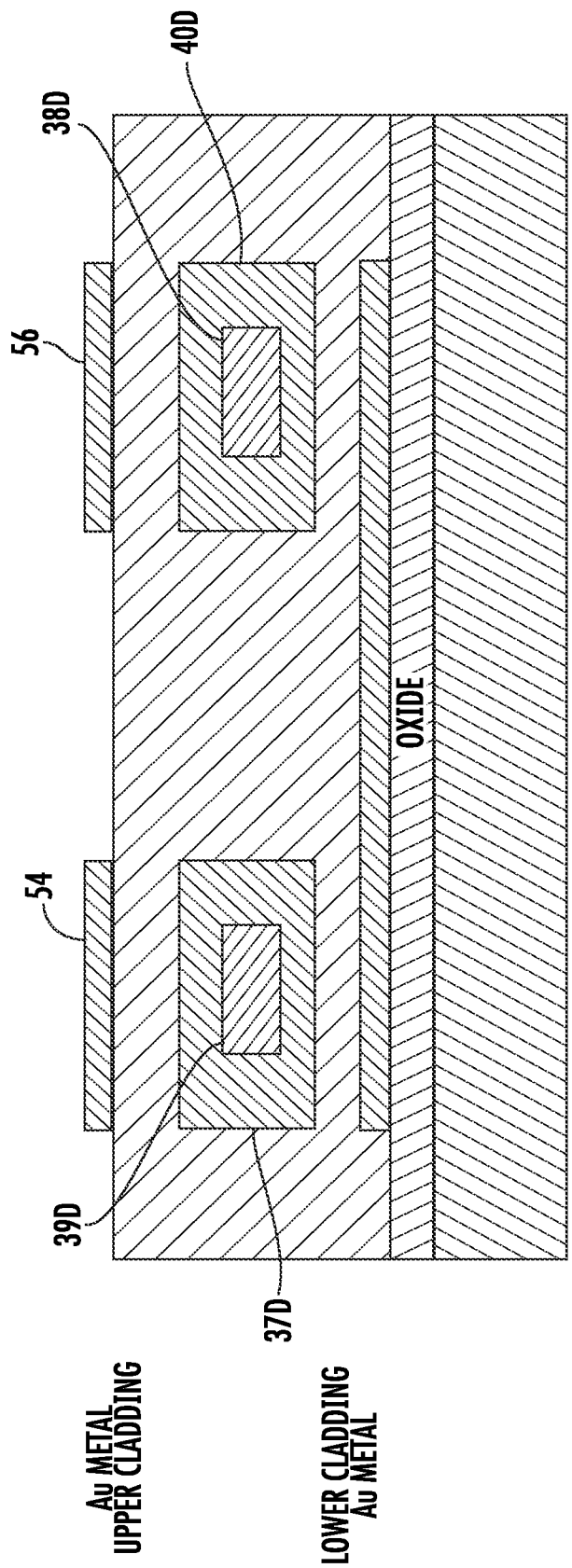
FIG. 21 is a cross-sectional view of the Mach-Zehnder modulator of FIG. 16 as seen from the line 21-21.
Figure 22:
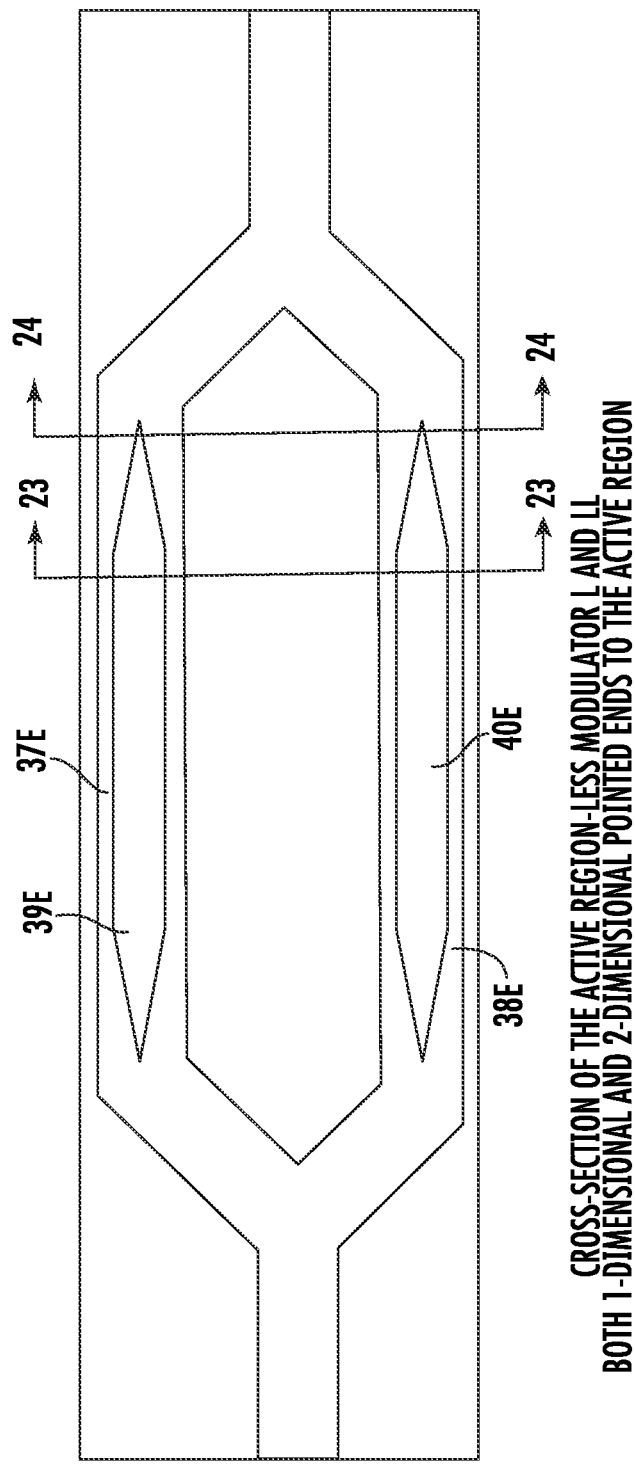
FIG. 22 is a top plan view of a seventh example of an active core region in a Mach-Zehnder modulator in accordance with the present invention.
Figure 23:
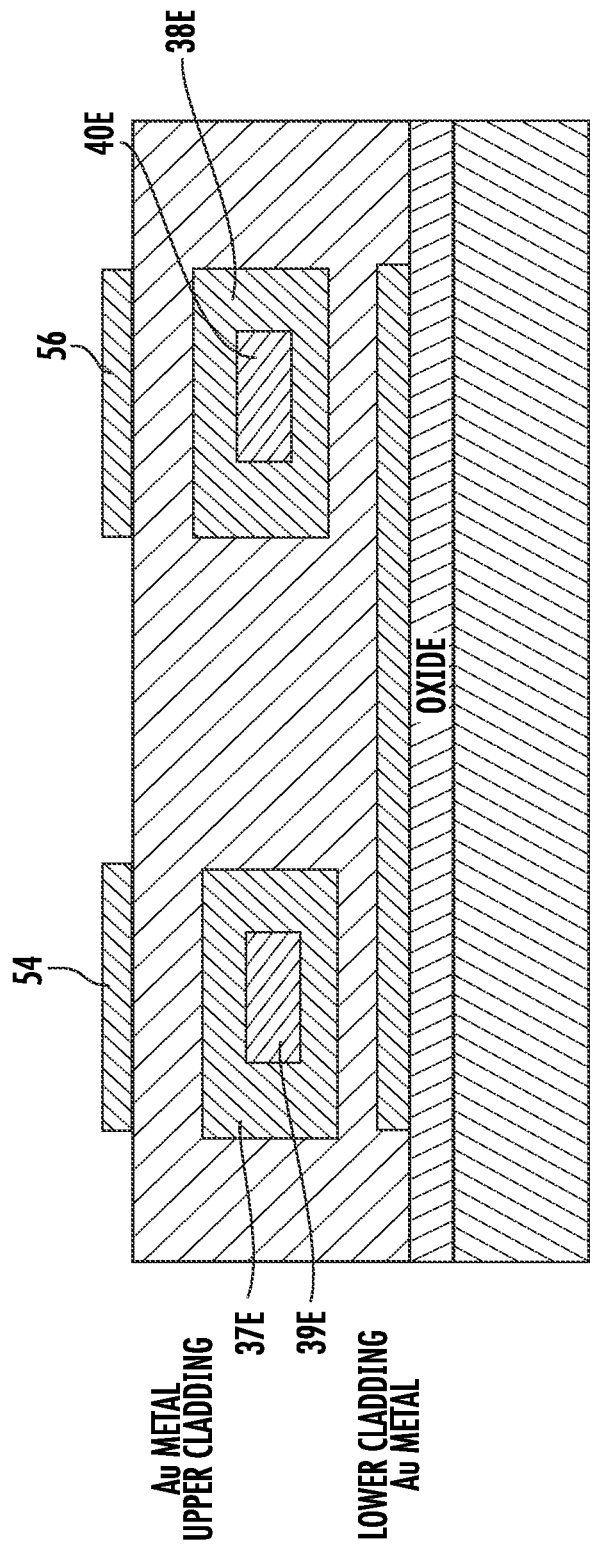
FIG. 23 is a cross-sectional view of the Mach-Zehnder modulator of FIG. 22 as seen from the line 23-23.
Figure 24:
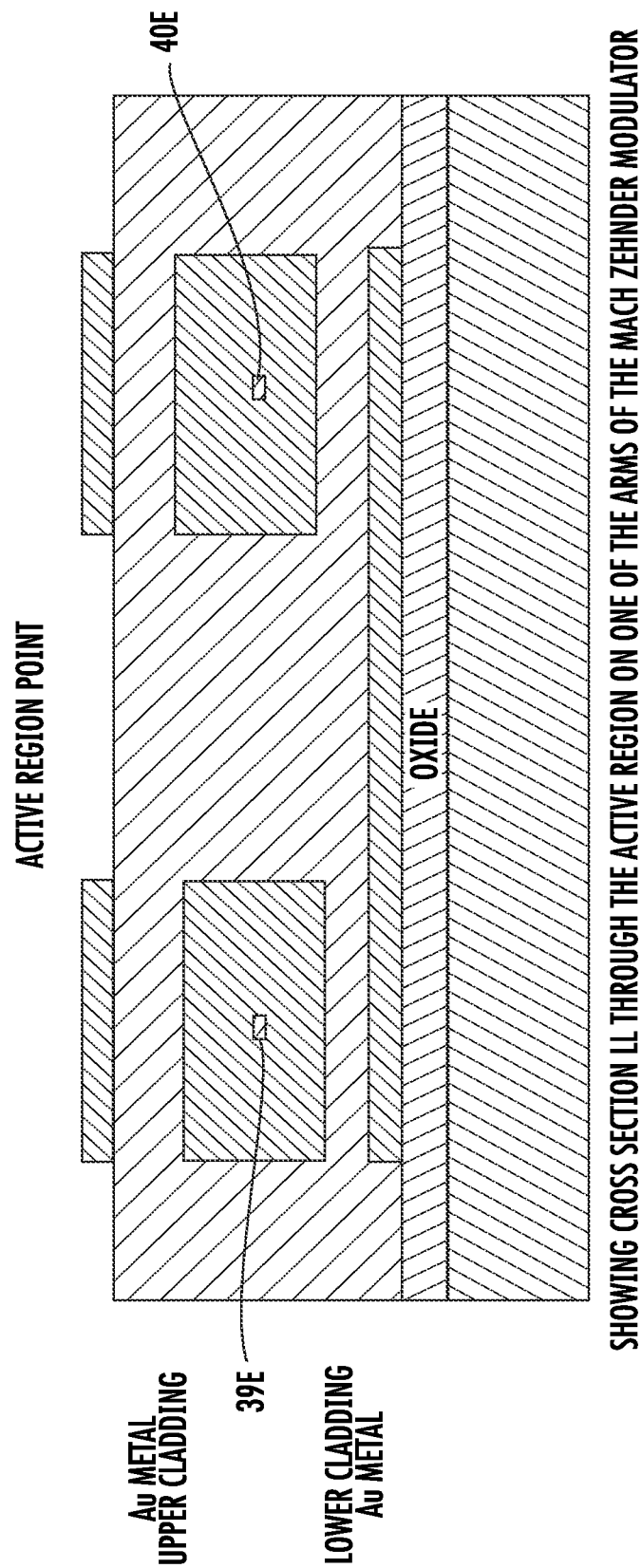
FIG. 24 is a cross-sectional view of the Mach-Zehnder modulator of FIG. 22 as seen from the line 24-24.
Figure 25:
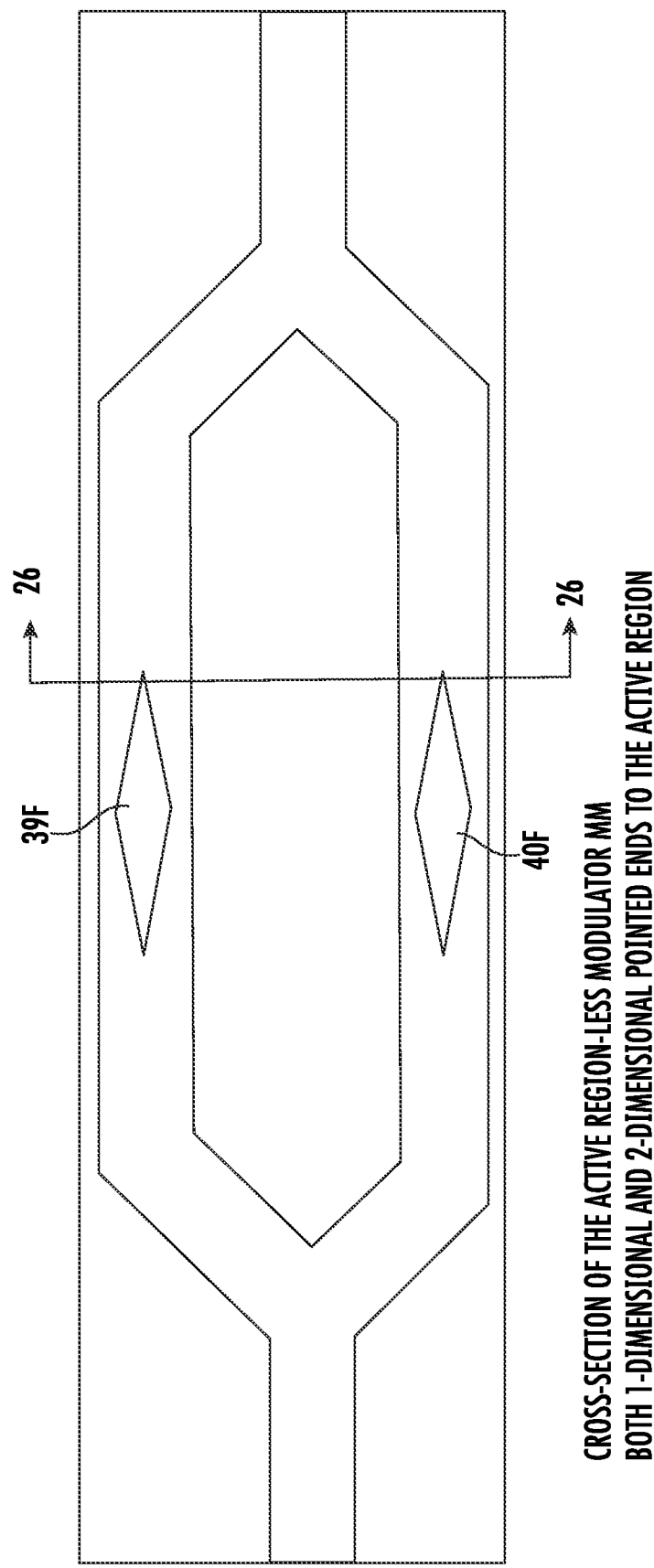
FIG. 25 is a top plan view of an eighth example of an active core region in a Mach-Zehnder modulator in accordance with the present invention.
Figure 26:
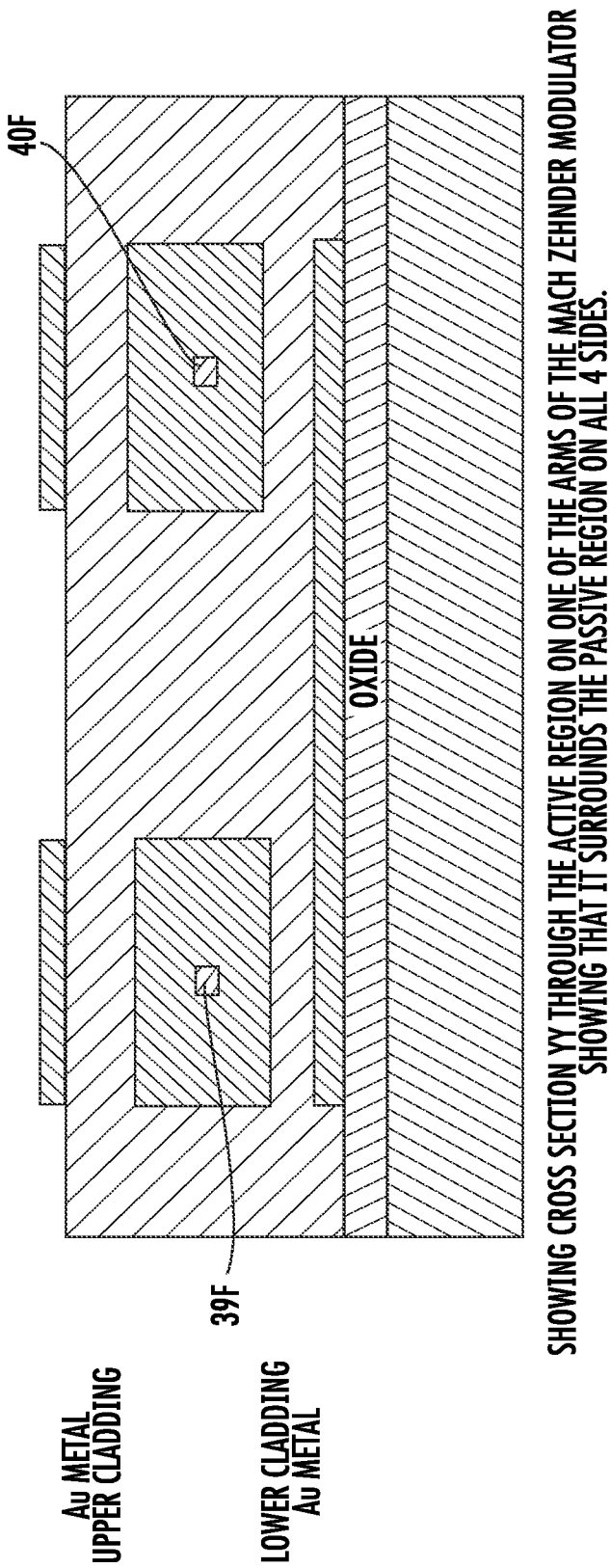
FIG. 26 is a cross-sectional view of the Mach-Zehnder modulator of FIG. 25 as seen from the line 26-26.

Referring specifically to FIGS. 20 and 21, passive core regions 37D and 38D are rectangular in cross-section but include an elongated rectangular cavity extending approximately the length of central portions 37a and 38a of legs 39 and 40. The elongated rectangular cavities are active core regions or components 39D and 40D completely surrounded by passive core regions 37D and 38D, respectively. Again, details as to the ends of active core regions or components 39d and 40d are not shown, since any of the above examples, or others, can be used. The example illustrated in FIGS. 22-24 is essentially similar to the example illustrated in FIGS. 20 and 21, except that both ends of active core regions or components 39E and 40E are tapered horizontally and vertically (as illustrated by the cross-sections shown in FIGS. 23 and 24) to form upper and lower adiabatic transitions. The example illustrated in FIGS. 25 and 26 is essentially similar to the examples illustrated in FIGS. 20 and 23, except that the length of active core regions or components 39F and 40F are substantially shorter to illustrate that lengths can be variable. In this example, both ends of active core regions or components 39F and 40F are tapered horizontally and vertically (as illustrated by the cross-section shown in FIG. 26) to form upper and lower adiabatic transitions.

Figure 27:
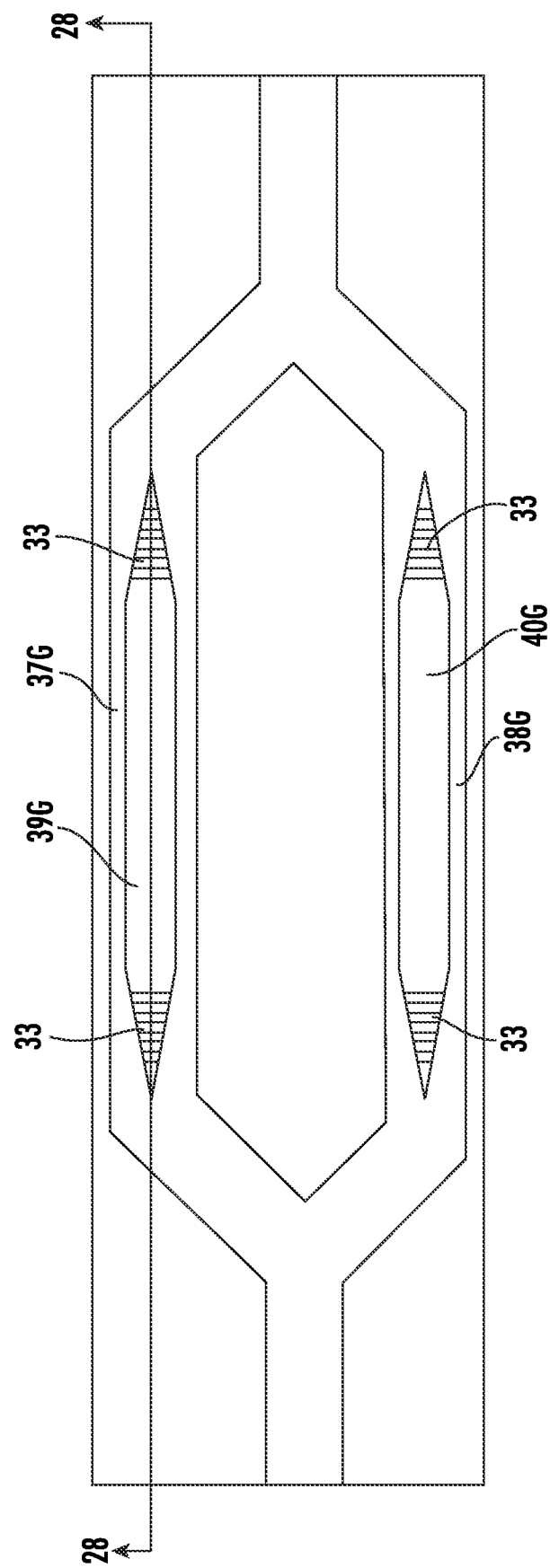
FIG. 27 is a top plan view of a ninth example of an active core region in a Mach-Zehnder modulator in accordance with the present invention.
Figure 28B:
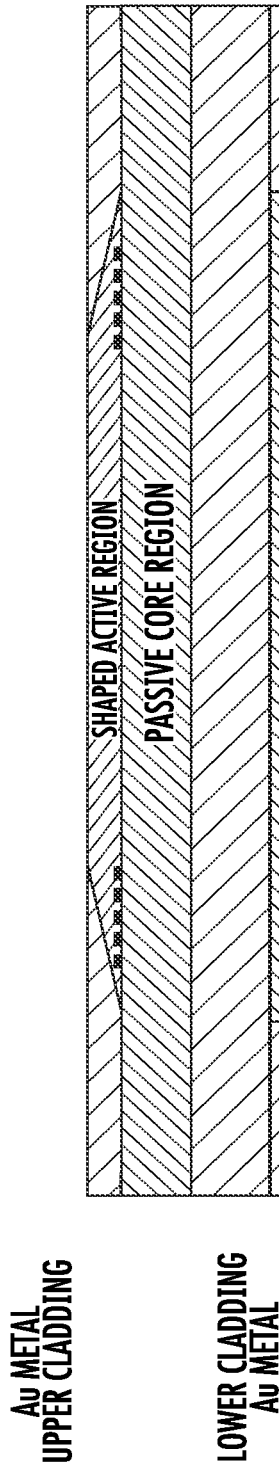
FIG. 28B is a cross-sectional view through an example of a first active region along one of the arms of the Mach-Zehnder modulator of FIG. 27 as seen from the line 28-28 showing a downwardly slanted adiabatic transition area with a digital grating in the lower surface.
Figure 30A:
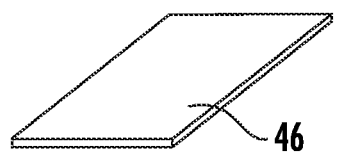
FIG. 30 (A)-(H) illustrate steps in the fabrication of the Mach-Zehnder modulator of FIG. 13.
Figure 30B:
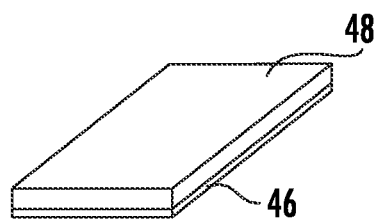
Figure 30C:
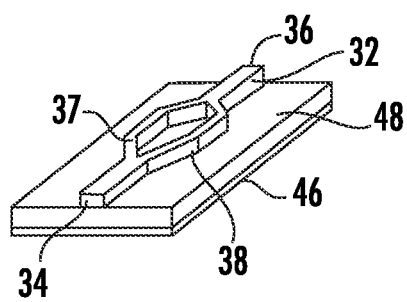
Figure 30D:
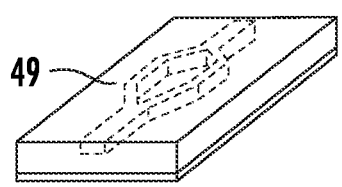
Figure 30E:
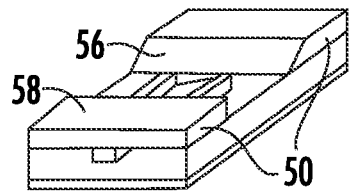
Figure 30F:
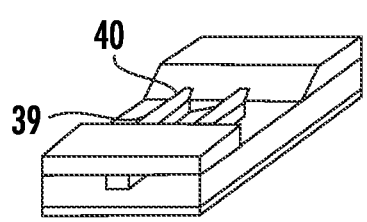
Figure 30G:
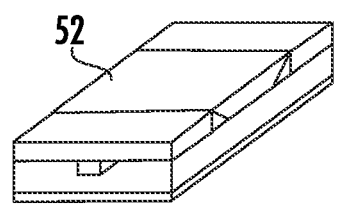
Figure 30H:
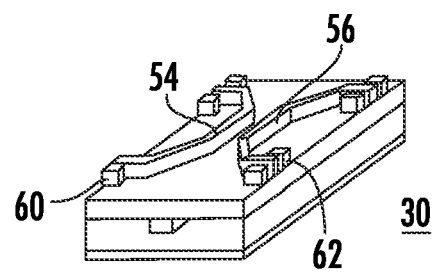

Referring to FIGS. 27-29, an example of active core regions or components, designated 39G and 40G, are illustrated in which digital gratings 33 are formed adjacent each end of each component 39G and 40G. As understood by the skilled artisan, digital gratings can be used to turn light at different angles generally up to and including ninety degrees. In the present example, digital gratings 33 are used to help or accelerate the evanescent coupling of light from passive core regions 37g and 38g into and out of active core regions or components 39G and 40G. Thus, in FIG. 28A, digital grating 33 at the left end of passive core region 37G help couple light from passive core region 37G into active core region or component 39G and digital grating 33 at the right end of active core region 39G help couple light from active core region 39G into passive core region 37G. This feature can help insure that all light traversing modulator 30 is modulated in active core regions or components 39G and 40G. In FIG. 28A the adiabatic transition regions are slanted upwardly from the horizontal with digital gratings 33 formed in the upper surface. In FIG. 28B the adiabatic transition regions are slanted downwardly from the horizontal with digital gratings 33 formed in the lower surface to illustrate that the adiabatic transition will occur in either case. As illustrated by FIGS. 29A and 29B, digital gratings 33 can be varied in depth and periodicity to produce different amounts or angles of light deflection. Also, FIG. 29C illustrates that digital gratings 33 can extend completely through the slanted portion of the active component for a maximum deflection angle.

Generally, the adiabatic transition is accomplished using an angle of about 1 degree with the horizontal in the cladding layer. However, the angle can range from about 0.4 degrees to 1 degree. Also, optical mode confinement is dependent on the angle of the adiabatic transition region, thickness of the active component(s) and the passive region layers, and material characteristics such as refractive, and lateral dimensions. Various shapes and lengths of the adiabatic transition region can be designed in both width and height, as illustrated in various examples above.

Some fabrication details as to the above described structure are as follows. Organosilicate sol-gel solution is used for the cladding and passive region waveguide layers, which in the preferred embodiment consist of methacryloyloxy propyltrimethoxysilane. The refractive index of the layers can be varied by using zirconium IV-n-propoxide and molar ratios of 95-5% with a range of 60-40% to 99-1%. Sol-gels can be patterned using UV radiation via photomasks. Exposed portions of sol-gels are insoluble in isopropanol which is used as an etchant for the wet-etching process. Dry etching can also be utilized using SF6. Sol-gels can be cured via UV radiation as well as thermal baking.

Turning now to FIG. 30 steps (A) through (H) in the fabrication of Mach-Zehnder modulator 30 are generally illustrated. In step (A), lower electrode 46 is deposited on insulating layer 44 on substrate 42. Lower cladding layer 48 is deposited on lower electrode 46 in step (B). In step (C), passive core region 32 is formed on lower cladding layer 48 in the shape of a Mach-Zehnder modulator with an optical input 34, an optical output 36 and legs 37 and 38. Side lower cladding layer 49 is deposited in step (D) to planarize the structure. Shaped portion(s) 50 of upper cladding layer 52 are formed on portions of passive core region 32 and side lower cladding layer 49. Shaped portion(s) 50 preferably include evanescent optical coupling planes 56 and 58. In step (F), shaped active components 39 and 40 are formed on the exposed portions of passive core region 32 (central portions of legs 37 and 38) between evanescent optical coupling planes 56 and 58 of shaped portion(s) 50. Here it should be understood that light is coupled from passive core region 32 up into active components 39 and 40 and back down into passive core region 32 by the evanescent optical coupling. Upper cladding layer 52 is completed in step (G) to enclose active components 39 and 40 and planarize the structure. Upper electrodes 60 and 62 are formed on upper cladding layer 52 with central portions 54 and 56 overlying active components 39 and 40, respectively.

Figure 31A:
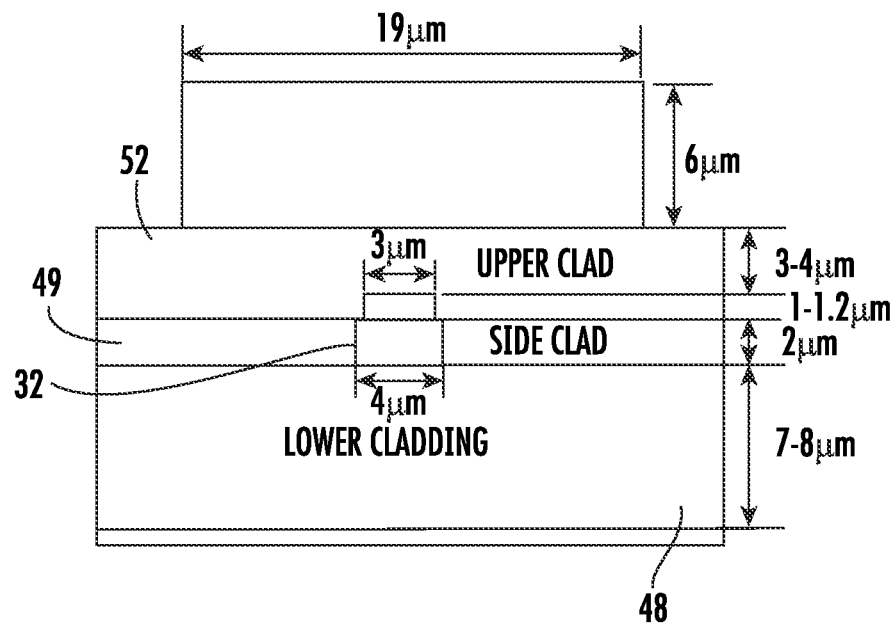
FIG. 31 (A) is a cross sectional view and (B) is side view of one leg of a Mach-Zehnder modulator illustrating dimensions of the various components of the Mach-Zehnder modulator of FIG. 13.
Figure 31B:
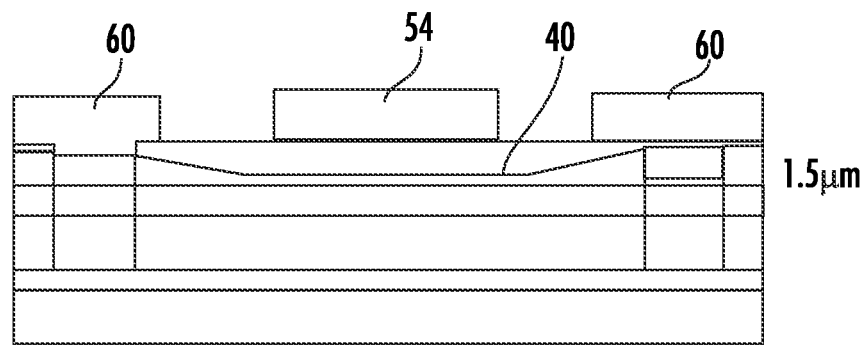

Referring to FIGS. 31(A) and (B), some typical measurements for the Mach-Zehnder modulator 30 are illustrated. Examples of ranges for the various components include: 7-8 µm thick for lower cladding layer 48; 2 µm thick and 4 µm width for passive core region 32; 2 µm thick for side cladding layer 49; 1-1.2 µm thick and 3 µm width for active components 39 and 40; and 3-4 µm for upper cladding layer 52. Also, some refractive indexes of the various layers in a preferred embodiment are as follows. Lower cladding layer 48 is formed of sol-gel such as Si/Zr with a molar ratio of 85/15 and has a refractive index of 1.487, with a range of 1.0 to 1.8, preferably 1.4 to 1.6. Passive region core 32 has an R1> than that of lower cladding layer 48 (R=refractive index) and a refractive index of 1.500, with a range of 1.0 to 1.8, preferably 1.4 to 1.6. Side cladding layer 49 has a refractive index of 1.487, with a range of 1.0 to 1.8, preferably 1.4 to 1.6. Upper cladding layer 52 has a refractive index of 1.487, with a range of 1.0 to 1.8, preferably 1.4 to 1.6.

Figure 32A:
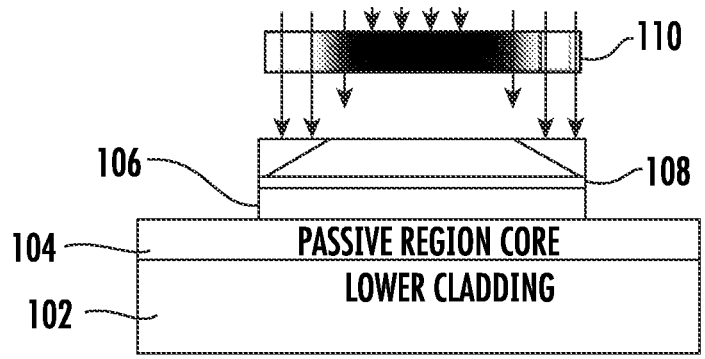
FIGS. 32 (A), (B), and (C) illustrate steps in one process for fabricating the active layer in a Mach-Zehnder modulator.
Figure 32B:
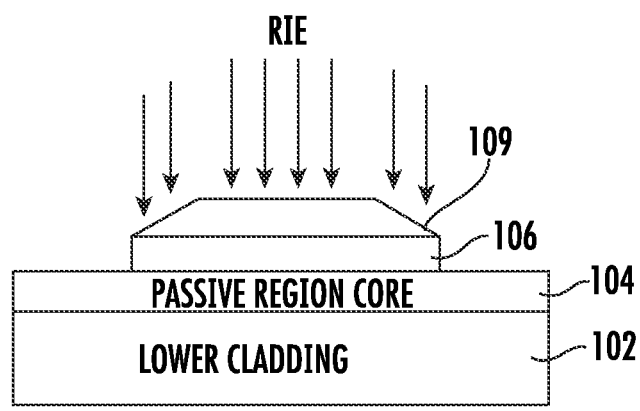
Figure 32C:
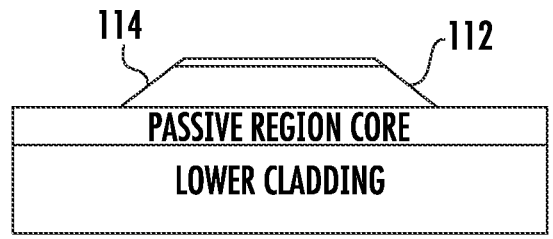

Turning now to FIGS. 32 (*a*), (*b*), and (*c*), a method of fabricating shaped active components 39 and 40 is illustrated. The method illustrated and described is important in the fabrication of the various tapers and designs described herein, since all of the various tapers and designs can be fabricated using this process. Referring specifically to FIG. 18 (*a*), a lower cladding layer 102 is formed with a passive region core 104 thereon, preferably as described above. A layer 106 of EO polymer is patterned on the surface of passive region core 104 in a selected location or locations. A protective layer 108 is deposited on the surface of layer 106 and a layer of photo resist is deposited on protective layer 108. Protective layer 108 is exposed through a graduated mask 110 and the exposed portions removed in a well-known process to leave a photo resist etch mask as illustrated in FIG. 18 (*b*). Using an RIE etching technique (dry etching), the structure of FIG. 18 (*b*) is etched to form edges of EO polymer layer 106 into adiabatic transition surfaces 112 and 114. One advantage of this process is that the length of adiabatic transition surfaces 112 and 114 can be easily controlled to longer lengths (e.g. >1.5 mm). Also, the shape of adiabatic transition surfaces 112 and 114 can be changed for performance optimization, for example, the shape can be super linear, curved (concave or convex) in addition to a straight angled line.

Referring to FIG. 33, the effects on adiabatic transition of light between the passive region core and the active component core as the EO polymer thickness is varied from 1.6 μm to 0.4 μm (FIGS. (B)-(E)), respectively, is illustrated. In all four examples the passive region core has a 2 μm thickness and a 4 μm width. It can be seen that the thicker passive region cores result in lower transition loss and higher mode confinement. Referring additionally to FIG. 34, the effects on adiabatic transition of light between the passive region core and the active component core as the passive region core thickness is varied from 2 μm to 4 μm (B)-(D), respectively, is illustrated. In all three examples the EO polymer has a 1.6 μm thickness and a 4 μm width. It can be seen that the thicker passive region cores result in lower transition loss, higher mode confinement and stable transition.

An additional test performed on a Mach-Zehnder modulator and illustrated in FIGS. 35 (A) and (B) is believe to be of interest. In these examples, light is introduced into a Mach-Zehnder modulator (e.g. modulator 30 of FIG. 4) with no misalignment in FIG. (A) and with misalignment in FIG. (B). In both examples the EO polymer thickness is 1.2 μm, the passive core region thickness is 2 μm, and the index of refraction between the passive core region and the EO polymer is 0.013. The graphs in both figures show that in either example there is lower transition loss, higher mode confinement, stable transition between the passive core region and the EO polymer, and stable separation of light in the Y branches of the modulator.

Figure 36:
Figure 37:
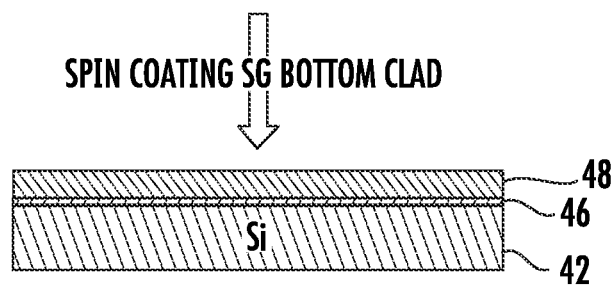
Figure 38:
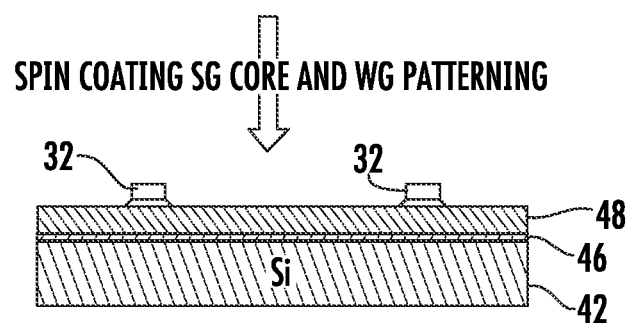

Turning to 36-43 several steps in the fabrication of a vertical taper EO polymer waveguide are illustrated. Basically, the steps illustrated in FIGS. 36-43 follow the steps illustrated in FIG. 30 (A)-(H). Referring specifically to FIG. 36, a step of patterning bottom gold electrode 46 on substrate 42 which includes using photoresist and 500 nm of gold with a wet etch, is illustrated. Referring additionally to FIG. 37, the lower cladding layer 48 is deposited which includes a sol-gel layer 6.5 μm thick. Referring additionally to FIG. 38, a layer of sol-gel is spun onto lower cladding layer 48 and patterned to form passive core region 32. Preferably, the patterning includes a layer of photoresist which hardens when exposed to UV light. The unexposed portions of photoresist are removed using IPA etch. The remaining material is passive core region 32 approximately 2 μm high or thick. A layer of sol-gel is spun on the structure to form side coating or cladding 49, which also planarizes the structure, as illustrated in FIG. 39.

Referring specifically to FIG. 40A to FIG. 40C, which show an end view, a side view, and a top plan view, a sol-gel layer is spin coated on side coating or cladding 49 and passive core region 32 and patterned to form upper cladding layer 50/56 defining tapered trenches. In this example, the trenches defining waveguides (active components) 39 and 40 are on a 50 μm spacing and are nominally 12 μm wide and 2 μm deep. The taper formed at each end of the trenches is approximately 1.5 mm to 2 mm long generating an upward angle to the horizontal of approximately 1 degree or less. Referring specifically to FIG. 41A to FIG. 41C, which show an end view, a side view, and a top plan view, an EO polymer layer is spin coated in the trenches and etched back to form vertically tapered or shaped active components 39 and 40. Referring additionally to FIG. 42*a* to FIG. 42C, which show an end view, a side view, and a top plan view, the tapered sides of the EO polymer layer forming active components 39 and 40 are etched to define substantially vertical sides. In this preferred method, the EO polymer layer is patterned using an Au hard mask which is formed by depositing a layer, approximately 50 nm thick, of Au, and dry etching the layer of Au. The EO polymer is dry etched through the Au mask after which the Au is removed. Referring additionally to FIG. 43*a* to FIG. 43C, which show an end view, a side view, and a top plan view, a sol gel top cladding layer 52 is deposited over the structure and baked to cure the structure.

Turning to 44-48 several steps in the fabrication of a vertical taper EO polymer waveguide are illustrated in which the active layer of EO polymer includes a vertical taper formed at each end that is approximately 1.5 mm to 2 mm long with a downward angle to the horizontal of approximately 1 degree or less. Basically, the steps illustrated in FIGS. 44-48 follow the steps illustrated in FIGS. 36-43 except that in FIGS. 45A to 45C the trenches are formed with a flat bottom and in FIGS. 46A to 46C active components of EO polymer are deposited in the trenches with downwardly angled vertical tapers using, for example, the process described in conjunction with FIGS. 32(*a*), (*b*) and (*c*).

Figure 49A:
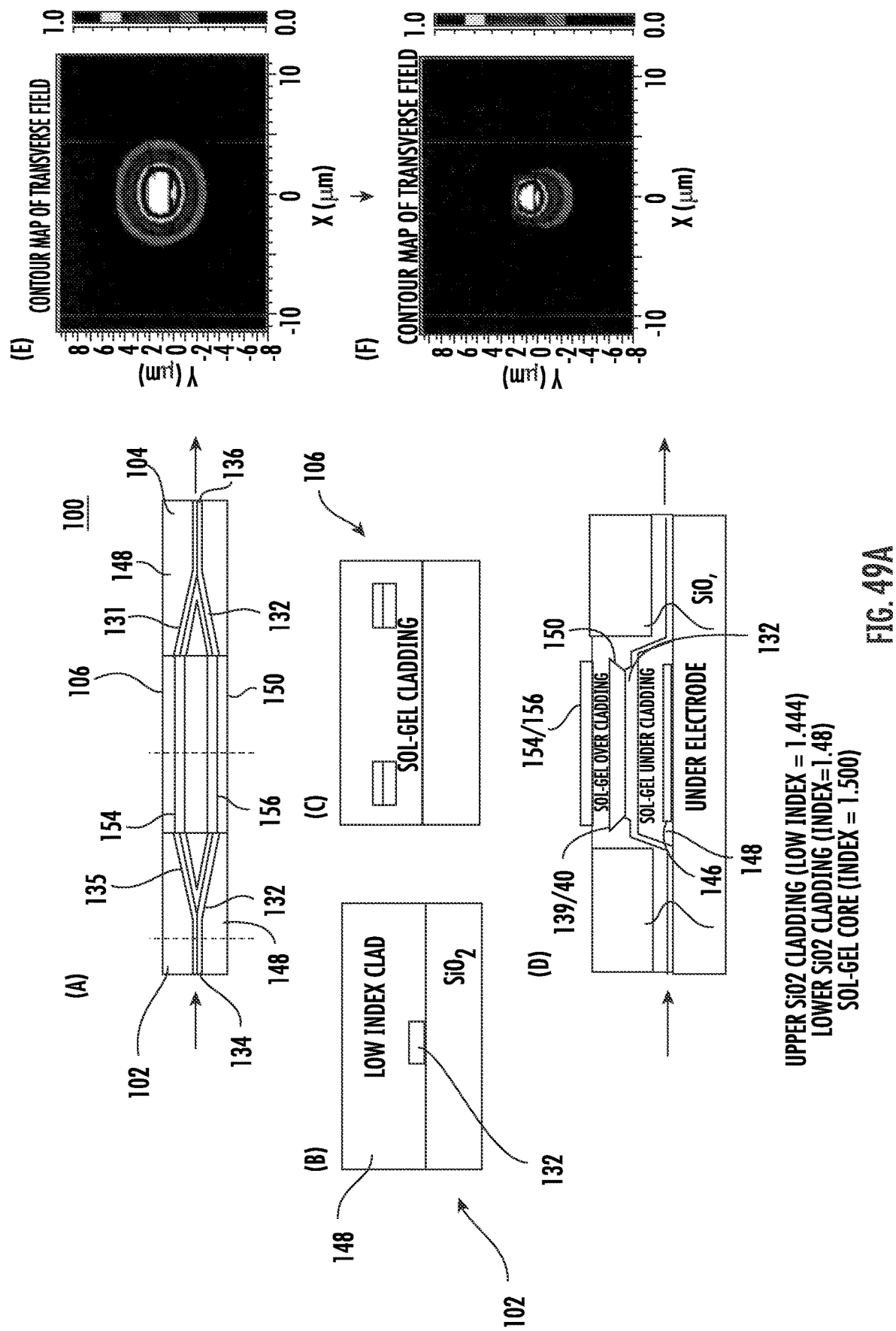
FIGS. 49A (a)-(f) illustrate fabrication and waveguiding mode for a first vertical taper waveguide with an upwardly slanted adiabatic transition area.

Turning to FIGS. 49A (a)-(f) fabrication and waveguiding mode for a first vertical taper waveguide 100 are illustrated. Here it should be noted that a passive waveguide core is defined over an insulating layer and has a first passive region, a second passive region, and an active region optically coupling the first passive region and the second passive region to form a continuous passive waveguide core between a light input and a light output. Waveguide 100 includes an input end 102 and an output end 104, both of which are represented by cross-sectional view (b). The entire structure is fabricated on an insulating layer of $SiO_2$ which may be formed on a substrate of silicon or other semiconductor material. Input end 102 includes a sol-gel silica or doped $SiO_2$ passive core 132 defining an optical input 134 and a Y-branch 135 optically coupled to an active region 106. Output end 104 includes a sol-gel silica or doped $SiO_2$ passive core 132 defining an optical output 136 and a Y-branch 131 optically coupled to active region 106. In both input end 102 and output end 104 core 132 is enclosed in a low index cladding layer 148.

Figure 49B:
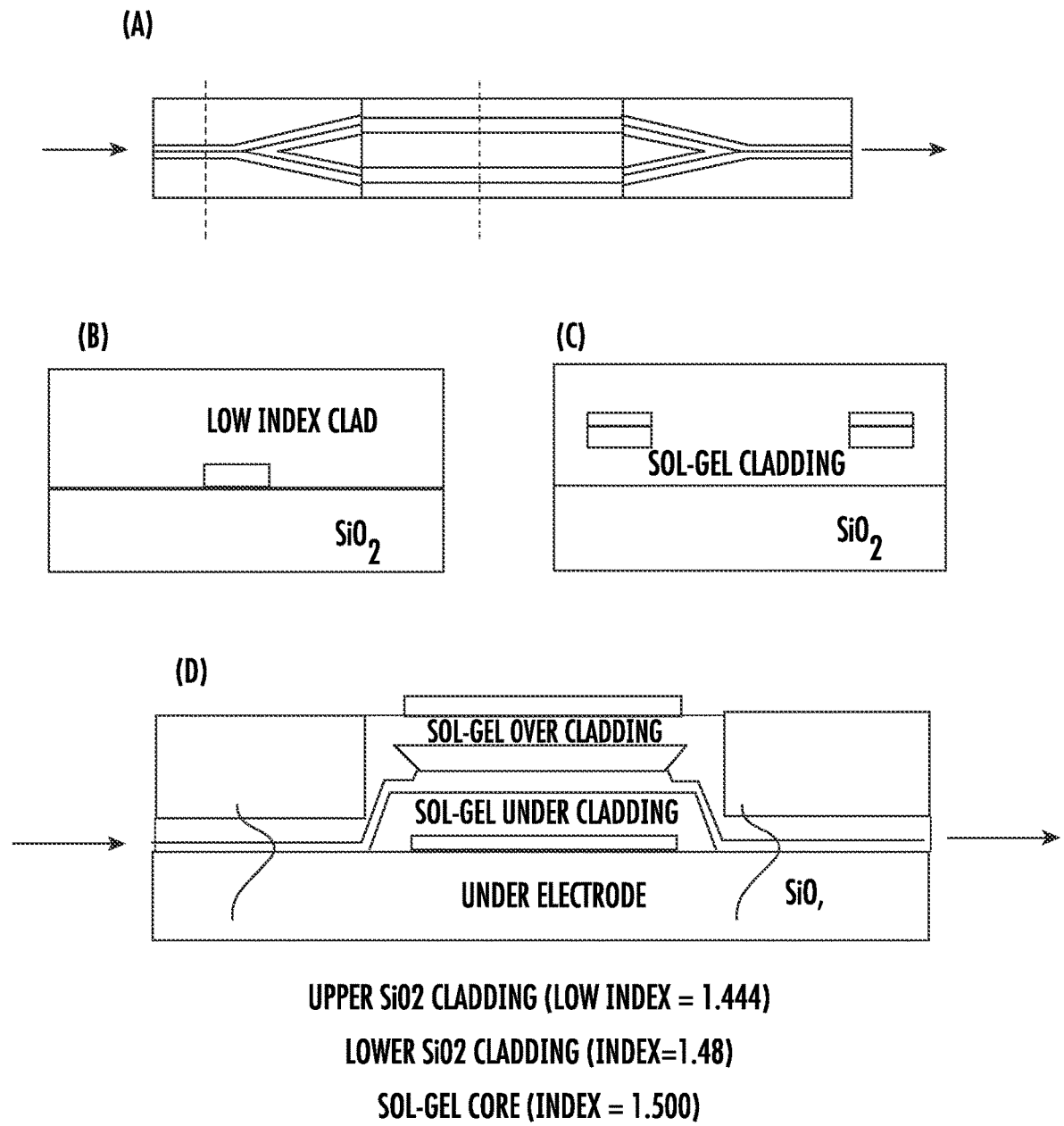
FIG. 49B (a)-(d) illustrate fabrication and waveguiding mode for a first vertical taper waveguide with a downwardly slanted adiabatic transition area.

Active region 106 includes, in stacked orientation, under electrode 146, sol-gel under cladding 148', sol-gel passive core 132 optically coupled to Y-branch 135 and Y-branch 131, EO polymer core 139/140, sol-gel upper cladding 150, and upper electrodes 154 and 156. In this specific example, the EO polymer core has upwardly slanted adiabatic transition areas at each end. Also, in this specific example the preferred materials included in input end 102 and output end 104 are a lower $SiO_2$ cladding with an index of 1.48, a sol-gel core with and index of 1.500, and an upper $SiO_2$ low index cladding with an index of 1.444. A feature that results from this combination is that waveguiding light in input end 102 and output end 104 transmits through low loss $SiO_2$ cladding, as illustrated in FIGS. (e) and (f), when sol-gel core is used. Both sol-gel core and sol-gel cladding are used in active region 106 to pole EO polymer because the conductivity of sol-gel is needed for the poling operation. Turning to FIG. 49B (a)-(d) fabrication and waveguiding mode for another vertical taper waveguide are illustrated. In this specific example, the EO polymer core has downwardly slanted adiabatic transition areas at each end. Basically, except for the reversal in taper of the slanted adiabatic transition areas, all of the materials are the same.

Figure 50A:
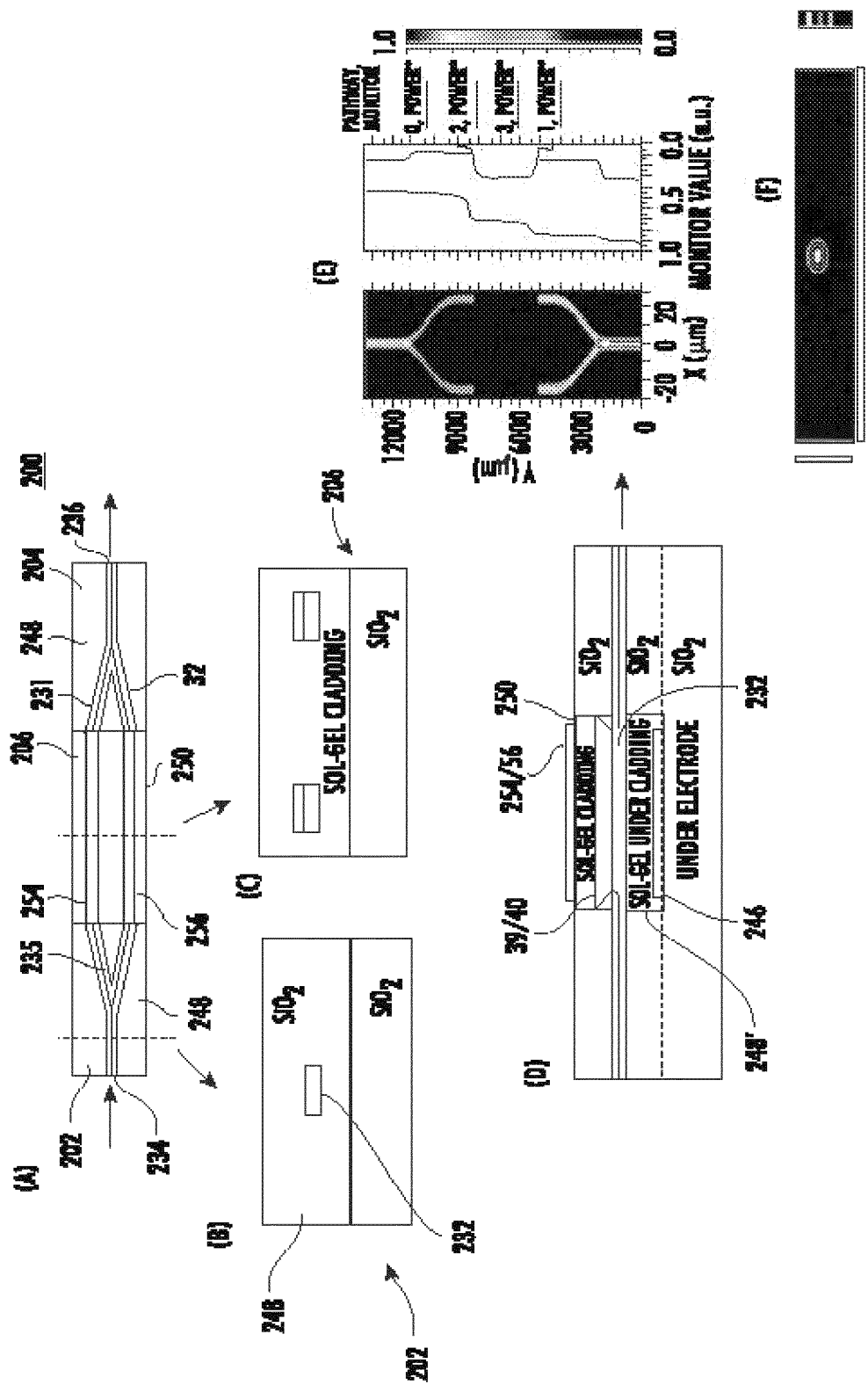
FIG. 50A (a)-(f) illustrate fabrication and waveguiding mode for a second vertical taper waveguide with an upwardly slanted adiabatic transition area.

Turning to FIGS. 50 (a)-(f) fabrication and waveguiding mode for a second vertical taper waveguide 200 are illustrated. Here it should be noted that a passive waveguide core is defined over an insulating layer and has a first passive region, a second passive region, and an active region optically coupling the first passive region and the second passive region to form a continuous passive waveguide core between a light input and a light output. Waveguide 200 includes an input end 202 and an output end 204, both of which are represented by cross-sectional view (b). The entire structure is fabricated on an insulating layer of $SiO_2$ which may be formed on a substrate of silicon or other semiconductor material. Input end 202 includes a doped $SiO_2$ passive core 232 defining an optical input 234 and a Y-branch 235 optically coupled to an active region 206. Output end 204 includes a doped $SiO_2$ passive core defining an optical output 236 and a Y-branch 231 optically coupled to active region 206. In both input end 202 and output end 204 core 232 is enclosed in a doped $SiO_2$ cladding layer 248. While cladding layer 248 is illustrated as a single material it will be understood that cladding layer 248 is normally formed by depositing a lower layer of cladding and then depositing an upper layer of cladding.

Figure 50B:
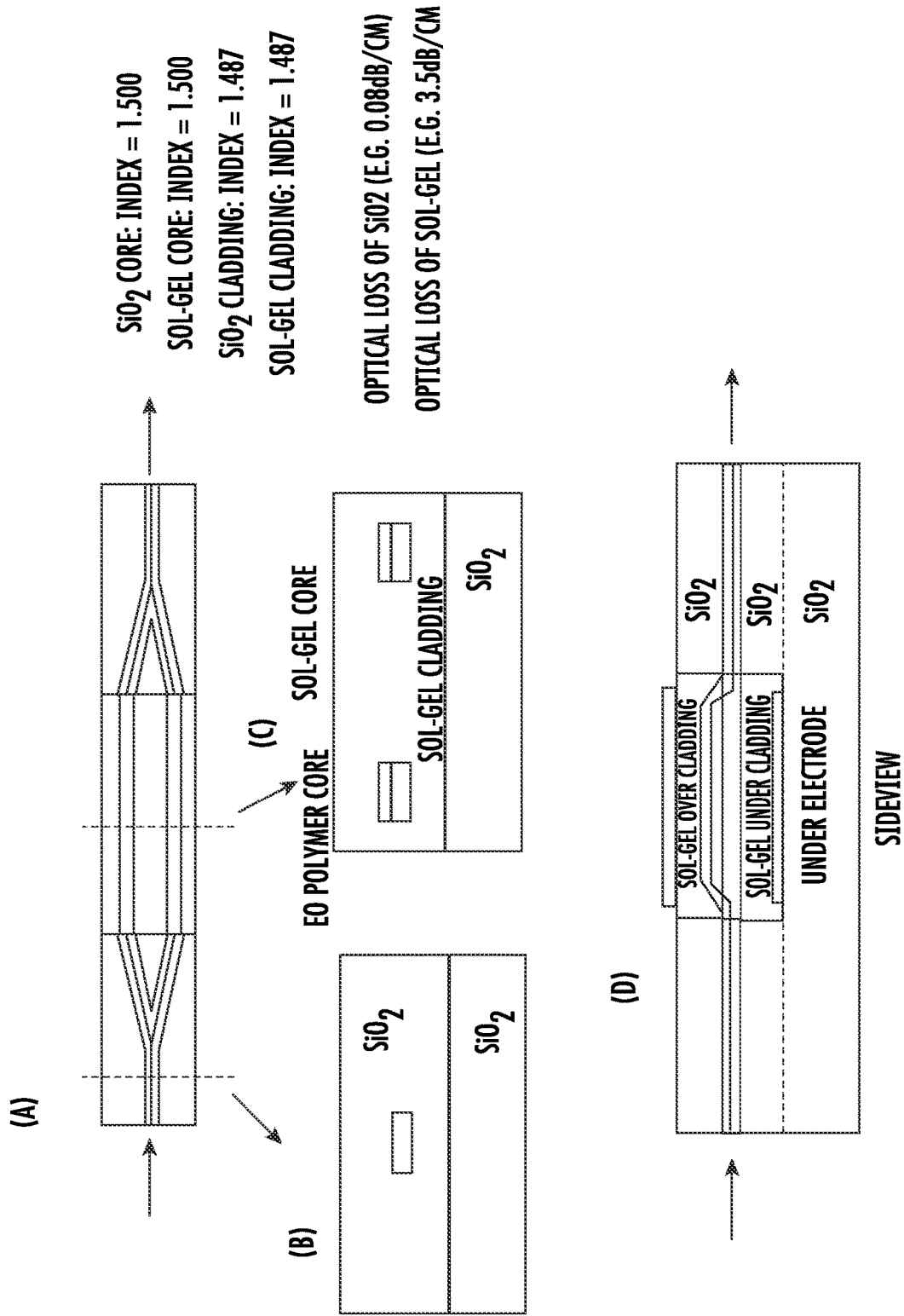
FIG. 50B (a)-(d) illustrate fabrication and waveguiding mode for a second vertical taper waveguide with a downwardly slanted adiabatic transition area.

Active region 206 includes, in stacked orientation, under electrode 246, sol-gel under cladding 248', sol-gel passive core 232 optically coupled to Y-branch 235 and Y-branch 231, EO polymer core 239/240, sol-gel upper cladding 250, and upper electrodes 254 and 256. In this specific example, the EO polymer core has upwardly slanted adiabatic transition areas at each end. Both sol-gel core and sol-gel cladding are used in active region 206 to pole EO polymer because the conductivity of sol-gel is needed for the poling operation. In this specific example the preferred materials included in input end 202 and output end 204 are $SiO_2$ cladding 248, with an index of 1.487, surrounding a doped $SiO_2$ core with and index of 1.500. A feature that results from this combination is that waveguiding light in input end 202 and output end 204 transmits through low loss $SiO_2$ core 232 and cladding 248, as illustrated in FIG. 45(f). As illustrated in FIG. 45(e), the optical loss in the $SiO_2$ (e.g. 0.08 dB/cm) is much less than the optical loss in sol-gel (e.g. 3.5 dB/cm). Turning to FIG. 50B (a)-(d) fabrication and waveguiding mode for another vertical taper waveguide are illustrated. In this specific example, the EO polymer core has downwardly slanted adiabatic transition areas at each end. Basically, except for the reversal in taper of the slanted adiabatic transition areas, all of the materials are the same.

Figure 51:
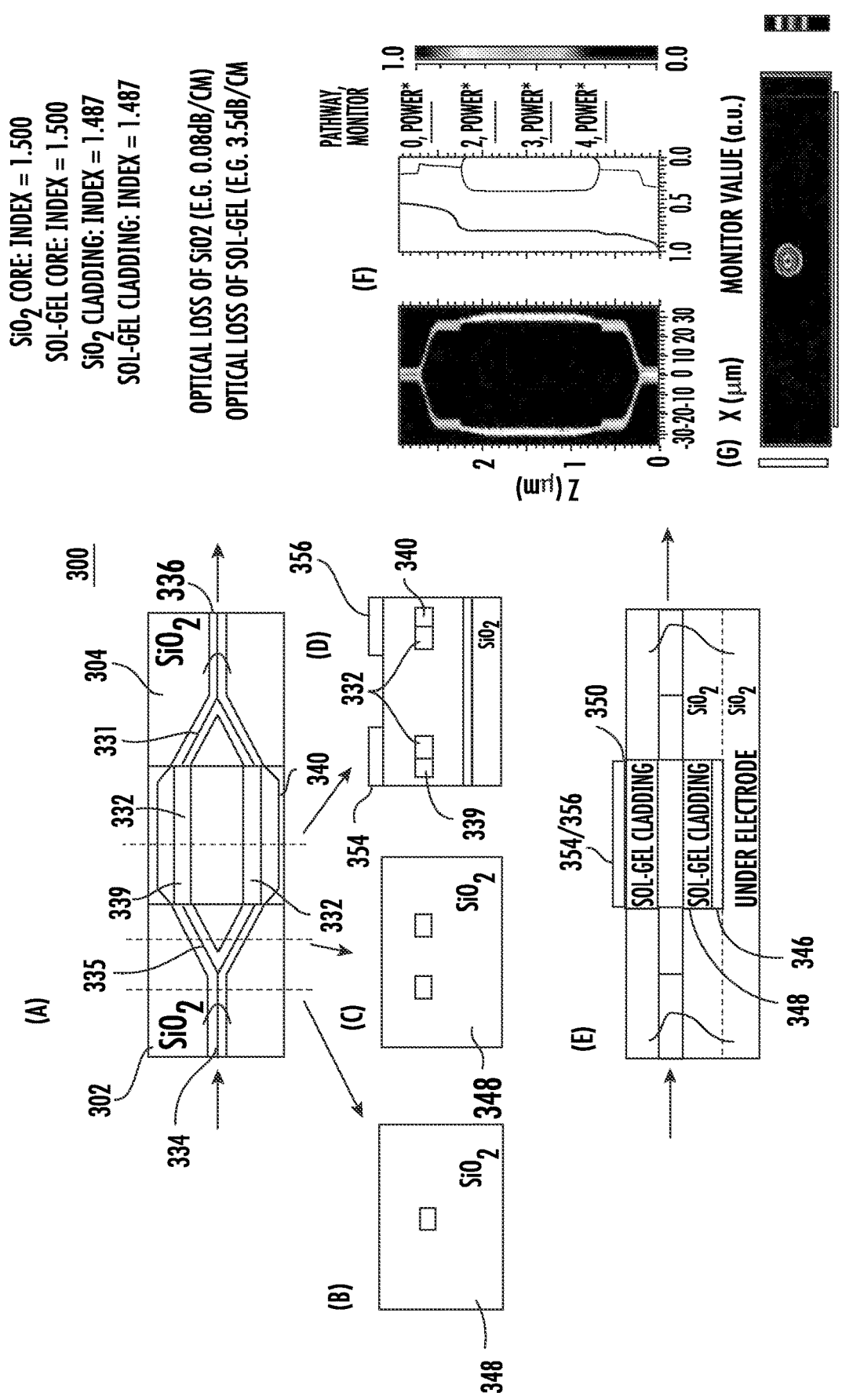
FIGS. 51 (a)-(g) illustrate fabrication and waveguiding mode for a coplanar taper waveguide.

Turning to FIGS. 51 (a)-(g) fabrication and waveguiding mode for a coplanar taper waveguide 300 are illustrated. Here it should be noted that a passive waveguide core is defined over an insulating layer and has a first passive region, a second passive region, and an active region optically coupling the first passive region and the second passive region to form a continuous passive waveguide core between a light input and a light output. Waveguide 300 includes an input end 302 and an output end 304, both of which are represented by cross-sectional view (b). The entire structure is fabricated on an insulating layer of $SiO_2$ which may be formed on a substrate of silicon or other semiconductor material. Input end 302 includes a doped $SiO_2$ passive core 332 defining an optical input 334 and a Y-branch 335 optically coupled to an active region 306. Output end 304 includes a doped $SiO_2$ passive core 332 defining an optical output 336 and a Y-branch 331 optically coupled to active region 306. A cross-sectional view of both Y-branches 335 and 331 is illustrated in FIG. 46(c). In both input end 302 and output end 304 core 332 is enclosed in a $SiO_2$ cladding layer 348 which may be incorporated into the insulating layer of $SiO_2$. Active region 306 includes, in stacked orientation, under electrode 346, sol-gel under cladding 348', sol-gel passive core 332 optically coupled to Y-branch 335 and Y-branch 331, EO polymer core 339/340 formed on the outer sides of sol-gel passive core 332 (see for example FIGS. 16 and 17), sol-gel upper cladding 350, and upper electrodes 354 and 356. In this specific example under cladding 348' and upper cladding 350 are formed as a single cladding layer surrounding EO polymer core 339/340 and sol-gel passive core 332. While cladding layer 348 is illustrated as a single material it will be understood that cladding layer 348 is normally formed by depositing a lower layer of cladding and then depositing an upper layer of cladding. Both sol-gel core and sol-gel cladding are used in active region 306 to pole EO polymer because the conductivity of sol-gel is needed for the poling operation. In this specific embodiment the preferred materials included in input end 302 and output end 304 are $SiO_2$ cladding 348, with an index of 1.487, surrounding a doped $SiO_2$ core with and index of 1.500. A feature that results from this combination is that waveguiding light in input end 302 and output end 304 transmits through low loss $SiO_2$ core 332 and cladding 348, as illustrated in FIG. 51(g). As illustrated in FIG. 51(f), the optical loss in the $SiO_2$ (e.g. 0.08 dB/cm) is much less than the optical loss in sol-gel (e.g. 3.5 dB/cm).

Thus, a new and improved active region-less polymer modulator is disclosed in which the active components do not reach the edge of the chip but are confined within the periphery of the chip. In a preferred embodiment the lower, upper, and side cladding layers are formed of sol-gel for simplicity and ease of fabrication. In some applications $SiO_2$ can be used as some of the cladding layers and doped $SiO_2$ can be used as the passive core. In all instances the refractive index of the core is higher than the refractive index of the cladding layers to insure that the light stays in the core. Generally, the refractive index in the core is 0.01 or more higher than the refractive index in the surrounding cladding layers. The use of a passive core with EO polymer active components adiabatically coupled thereto results in more efficient optical coupling between the modulator chip and the outside world, and with higher reliability, since the active material is never exposed to the outside world-atmosphere and with higher reliability, since the active material is not subject to optical reflections, rough surfaces, and other effects that could affect optical light transmission. Also, waveguiding in a Mach-Zehnder modulator results in equal separation between the two branches. It should also be noted that each end of each active component has an adiabatic transition area that can be varied in shape and length.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A polymer modulator comprising:
   a semiconductor substrate with an insulating layer on an upper surface of the substrate;
   a passive waveguide core defined over the insulating layer and having a first passive region including a modulator light input, a second passive region including a modulator light output, and a central passive portion spanning an active region optically coupling the first passive region and the second passive region to form a continuous passive waveguide core between the light input and the light output;
   the passive waveguide core in both the first passive region and the second passive region being surrounded by cladding;
   the cladding surrounding the passive waveguide core in both the first passive region and the second passive region having a first refractive index, the passive waveguide core in both the first passive region and the second passive region having a second refractive index, and the second refractive index being at least 0.01 higher than the first refractive index; and
   a lower cladding layer positioned between the insulating layer and the passive central portion of the passive waveguide core in the active region, the refractive index of the passive central portion of the passive waveguide core in the active region is at least 0.01 higher than the refractive index of the lower cladding layer;
   a shaped electro-optic polymer active core component carried by and abutting the central passive portion in the active region and being polled to align dipoles and promote modulation of light; and
   the shaped electro-optic polymer active core component including opposing ends that are each tapered horizontally and vertically, forming adiabatic transition areas with the passive central portion.

2. The polymer modulator as claimed in claim 1 wherein the active region extends at least as far as a modulation area defined by upper and lower modulation electrodes.

3. The polymer modulator as claimed in claim 1 wherein the active region further includes an upper cladding layer joined with the lower cladding layer in the active region to surround the shaped electro-optic polymer active core and the waveguide core in the active region, the refractive index of the passive waveguide core in the active region is at least 0.01 higher than the refractive index of the upper cladding layer.

4. The polymer modulator as claimed in claim 1 wherein the passive waveguide core in both the first passive region and the second passive region include $SiO_2$, and the passive waveguide core in both the first passive region and the second passive region being surrounded by a cladding of $SiO_2$, the $SiO_2$ included in the waveguide core in both the first passive region and the second passive region having a refractive index at least 0.01 higher than the refractive index of the $SiO_2$ included in the cladding of $SiO_2$.

5. The polymer modulator as claimed in claim 4 wherein the $SiO_2$ included in the passive waveguide core in both the first passive region and the second passive region is doped to increase the refractive index.

6. A polymer modulator comprising:
   a semiconductor substrate with an insulating layer on an upper surface of the substrate;
   a passive waveguide core defined over the insulating layer and having a first passive region defining a modulator light input, a second passive region defining a modulator light output, and a central passive portion spanning an active region optically coupling the first passive region and the second passive region to form a continuous passive waveguide core between the light input and the light output;
   the passive waveguide core in both the first passive region and the second passive region being surrounded by cladding;
   the cladding surrounding the passive waveguide core in both the first passive region and the second passive region having a first refractive index, the passive waveguide core in both the first passive region and the second passive region having a second refractive index, and the second refractive index being at least 0.01 higher than the first refractive index;
   a lower cladding layer partially surrounding the passive waveguide core in the active region, the refractive index of the passive waveguide core in the active region is at least 0.01 higher than the refractive index of the lower cladding layer;
   the active region further including a shaped electro-optic polymer active core component carried within a cavity formed in the passive central portion and abutting the passive waveguide core in the active region, the shaped electro-optic polymer active core component being polled to align dipoles and promote modulation of light;
   shaped electro-optic polymer active core component including opposing ends that are each tapered horizontally and vertically, forming adiabatic transition areas with the passive central portion; and
   the active region further including an upper cladding layer joined with the lower cladding layer of sol-gel in the active region to surround the shaped electro-optic polymer active core and the passive waveguide core in the active region, the refractive index of the waveguide core in the active region is at least 0.01 higher than the refractive index of the in the upper cladding layer.

7. The polymer modulator as claimed in claim 6 wherein the passive waveguide core in both the first passive region and the second passive region includes a Y-branch and the passive waveguide core in the active region includes spaced apart parallel legs, the spaced apart parallel legs being optically coupled to arms of both the Y-branch in the first passive region and the Y-branch in the second passive region to define a Mach-Zehnder modulator.

8. A method of fabricating a polymer modulator comprising the steps of:
   providing a semiconductor substrate and forming an insulating layer on an upper surface of the substrate;

defining a passive waveguide core on the insulating layer with a first passive region including a modulator light input, a second passive region including a modulator light output, and a central passive portion spanning an active region optically coupling the first passive region and the second passive region to form a continuous passive waveguide core between the light input and the light output, and depositing material in both the first passive region and the second passive region to form the passive waveguide core;

depositing a cladding in both the first passive region and the second passive region surrounding the passive waveguide core, the cladding surrounding the passive waveguide core in both the first passive region and the second passive region having a first refractive index, the material included in the passive waveguide core in both the first passive region and the second passive region having a second refractive index, and the second refractive index being at least 0.01 higher than the first refractive index;

depositing a lower cladding layer in the active region, forming a passive central portion having a cavity in the active region on the lower cladding layer to form the passive waveguide core in the active region, and the refractive index of the passive waveguide core in the active region is at least 0.01 higher than the refractive index of the sol-gel in the lower cladding layer; and forming a shaped electro-optic polymer active component within the cavity, abutting the passive waveguide core in the active region, the shaped electro-optic polymer active component having a length that extends only within a modulation area defined by modulation electrodes and including opposing ends that are each tapered horizontally and vertically, forming adiabatic transition areas with the passive central portion.

9. The method as claimed in claim 8 wherein the step of depositing the passive waveguide core in both the first passive region and the second passive region includes a step of forming a Y-branch in both the first passive region and the second passive region and the step of depositing the passive waveguide core in the active region includes forming spaced apart parallel legs, the spaced apart parallel legs being optically coupled to arms of both the Y-branch in the first passive region and the Y-branch in the second passive region to define a Mach-Zehnder modulator.

10. The method as claimed in claim 8 including a step of depositing a lower electrode on the insulating layer.

11. The method as claimed in claim 10 including a step of depositing an upper electrode on the upper cladding layer in the active region.

12. The method as claimed in claim 11 wherein the steps of depositing a lower electrode on the insulating layer and depositing an upper electrode on the upper cladding layer in the active region include forming the lower electrode and the upper electrode to define a modulation area.

* * * * *